(12) United States Patent
Lanigan, Sr. et al.

(10) Patent No.: US 8,585,347 B2
(45) Date of Patent: Nov. 19, 2013

(54) HUB AND DISTRIBUTION SYSTEM

(75) Inventors: John J. Lanigan, Sr., Orland Park, IL (US); Peter W. Mirabella, Schererville, IN (US)

(73) Assignee: Mi-Jack Products, Inc., Hazel Crest, IL (US)

( * ) Notice: Subject to any disclaimer, the term of this patent is extended or adjusted under 35 U.S.C. 154(b) by 671 days.

(21) Appl. No.: 11/821,962

(22) Filed: Jun. 26, 2007

(65) Prior Publication Data
US 2009/0003985 A1 Jan. 1, 2009

(51) Int. Cl.
*B65G 67/24* (2006.01)
(52) U.S. Cl.
USPC ............................... 414/809; 414/342
(58) Field of Classification Search
USPC .................... 414/342, 809, 139.4, 139.9
See application file for complete search history.

(56) References Cited

U.S. PATENT DOCUMENTS

| 1,207,237 A | 12/1916 | Stuart |
| 1,783,363 A | 12/1930 | Grob |
| 2,892,554 A | 6/1959 | Decker |
| 2,934,373 A | 4/1960 | Doty, Jr. |
| 2,958,538 A | 11/1960 | Norris et al. |
| 3,119,503 A | 1/1964 | Herpich et al. |
| 3,135,407 A | 6/1964 | Samuel |
| 3,208,608 A | 9/1965 | Tantlinger et al. |
| 3,314,655 A | 4/1967 | Steele |
| 3,415,490 A | 12/1968 | Steele |
| 3,520,433 A | 7/1970 | Blackburn |
| 3,700,128 A | 10/1972 | Noble et al. |
| 3,807,582 A | 4/1974 | Anderson |
| 3,891,100 A * | 6/1975 | Tamaki et al. ................ 414/342 |
| 4,076,134 A | 2/1978 | Landow |
| 4,093,084 A | 6/1978 | Ringer |
| 4,139,107 A * | 2/1979 | Ninomiya et al. ............ 414/392 |

(Continued)

OTHER PUBLICATIONS

Dr. Jean-Paul Rodrigue, "The Thruport in 21st Century American Rail Freight Transportation": Written Testimony for the Transportation & Infrastructure Subcommittee on Highways, Transit and Pipelines, U.S. House of Representatives, Jun. 21, 2006.*

(Continued)

*Primary Examiner* — Jonathan Snelting
(74) *Attorney, Agent, or Firm* — McCracken & Frank LLC

(57) ABSTRACT

A transfer method (600) is disclosed. It includes: delivering (602) a container via a rail car on train rails to a terminal; assigning (604) a corridor as to where to deliver the container, the corridor including a plurality of pathways in proximity to a track side location, each pathway including a containment cavity configured to receive a first handoff of the container from a crane to a first pathway and provide a second handoff of the container from the first pathway to a hauler, the plurality of pathways being substantially adjacent, aligned and in parallel and being configured at an angle of about 15 degrees or more to the train rails; picking (606) with a crane the container from a rail car and placing the container in the containment cavity comprising the first handoff in the corridor; and handing-off the container in the containment cavity of a pathway to a hauler comprising the second handoff, for facilitating transporting the container from the terminal to a desired remote destination via a hauler. The method provides an efficient, effective and semi-automated post-blocking method, such that each post-blocked group of containers has a similar desired remote destination, so that the containers can be easily located, loaded, handed-off and transported to a desired location.

13 Claims, 21 Drawing Sheets

(56) References Cited

U.S. PATENT DOCUMENTS

| | | | |
|---|---|---|---|
| 4,221,536 A | | 9/1980 | McFee |
| 4,522,546 A | | 6/1985 | Ringer |
| 4,522,550 A | | 6/1985 | Whitehouse |
| 4,915,576 A | | 4/1990 | Lanigan et al. |
| 5,378,105 A | | 1/1995 | Palko |
| 5,505,585 A | | 4/1996 | Hubbard |
| 5,511,927 A | | 4/1996 | Lanigan et al. |
| 5,540,532 A | | 7/1996 | Carder et al. |
| 5,857,821 A | * | 1/1999 | Wiedeck ............... 414/334 |
| 6,030,168 A | * | 2/2000 | Kroll et al. ............. 414/561 |
| 6,168,366 B1 | | 1/2001 | Horn |
| 6,190,107 B1 | * | 2/2001 | Lanigan et al. .......... 414/342 |
| 6,318,947 B1 | | 11/2001 | Hahn et al. |
| 6,439,128 B1 | | 8/2002 | Miller et al. |
| 7,123,132 B2 | | 10/2006 | Heidenback et al. |
| 7,704,032 B2 | | 4/2010 | Rash et al. |
| 7,779,604 B2 | | 8/2010 | Kapelski |
| 2003/0061085 A1 | | 3/2003 | Lanigan, Sr. |
| 2005/0244254 A1 | * | 11/2005 | Schratt et al. ............ 414/281 |
| 2006/0045659 A1 | | 3/2006 | Hubbard, Sr. |
| 2006/0245879 A1 | | 11/2006 | Lockamy et al. |
| 2006/0251498 A1 | | 11/2006 | Buzzoni et al. |
| 2006/0269379 A1 | | 11/2006 | Orr et al. |
| 2008/0141895 A1 | | 6/2008 | Lanigan et al. |
| 2008/0166211 A1 | | 7/2008 | Lanigan et al. |
| 2008/0213067 A1 | | 9/2008 | Jegers |
| 2008/0219804 A1 | | 9/2008 | Chattey |
| 2008/0219827 A1 | * | 9/2008 | Lanigan et al. .......... 414/792.8 |
| 2008/0243301 A1 | | 10/2008 | Lanigan et al. |
| 2008/0298939 A1 | | 12/2008 | Lanigan et al. |
| 2009/0003985 A1 | | 1/2009 | Lanigan et al. |

OTHER PUBLICATIONS

John Zumerchik et al., "Automated Transfer Management Systems and the Intermodal Performance of North American Freight Distribution," Journal of the Transportation Research Forum, pp. 59-76, Fall 2009.

Nathan Huynh et al. "Analysis of Stacking Priority Rules to Improve Drayage Operations Using Existing and Emerging Technologies," Transportation Research Record-Journal of the Transportation Research Board, pp. 1-8, Mar. 2010.

John Zumerchik et al., "An Analysis of Current Freight Performance Metrics and the Need for System-Wide Efficiency Metrics," submitted for consideration of presentation at the 91st Annual Meeting of the Transportation Research Board and Publication in the Transportation Research Record, pp. 1-16, submission Jul. 31, 2010.

Jean-Paul Rodrigue, "The Thruport Concept and Transmodal Rail Freight Distribution in North America," Journal of Transport Geography vol. 16, pp. 233-246, 2008.

Jack Lanigan, Sr. et al., "Next Generation Intermodal Terminals: Prospects for Improving Train and Truck Turn Times," pre-publication, pp. 1-15, Sep. 2009.

John Zurnerchik et al., "Sustainable Intermodal Rail Terminals: Cost Functions for Conventional and Advanced Terminals," pp. 1-2, Dec. 2009.

Jack Lanigan, Sr., et al. "Shared Intermodal Terminals and the Potential for Improving the Efficiency of Rail-Rail Interchange," Transportation Research Board Committee on Intermodal Freight Terminal Design and Operations (AT050), pp. 1-17, 2007.

* cited by examiner

HUB AND DISTRIBUTION SYSTEM

CROSS-REFERENCE TO RELATED APPLICATIONS

This application is a continuation-in-part of co-pending U.S. patent application Ser. No. 11/716,316, filed on Mar. 9, 2007.

FIELD OF THE INVENTION

This invention relates to transportation and logistics systems, and more particularly to a hub and distribution system.

BACKGROUND OF THE INVENTION

The intermodal industry has been streamlining to meet shipper's demands for quality service. Equipment manufacturers, truck load carriers and railroad lines play important roles in this process of rationization. Rationization, in the intermodal industry, involves the process of optimizing routes, rate services and equipment.

Efforts to simplify and expedite handling for rail and truck carriers have been attempted in the past. For example, there have been efforts to develop universal trailers, containers and attachments, to allow trucking companies, shippers and the railroad to work together to flourish.

The benchmark of intermodal service combines the road effectiveness of truck transport with the cost effectiveness of double-stacked rail transport. Service and price, not mode, are strong considerations for shippers. Shippers also have the following goals: on-time delivery, complete deliveries, reduced transit times to meet a predetermined order cycle schedule; reduced inventory with more inventory turns; and flexibility.

Improvements in intermodal transportation can effect ocean carriers, as well as rail and truckload carriers. Recently, intermodal traffic has become more dispersed, and less concentrated around the ports. Thus, there is an increased demand for efficient service and improved equipment.

Choosing the right mode for the right load in this competitive environment, is now becoming more important than ever. A shipper's delivery requirements are considered along with availability of shipment mode over-the-road and intermodal. Equipment availability, train schedules, distances and how to balance freight lines are some of the factors to be considered.

There is also a need to allow railroads and other transportation modes to work together to develop efficiencies, such as with new equipment, layouts and systems, scheduling techniques and the like to allow shippers to be able to choose transport products via railroad, truck or a combination of both, without losing productivity, while maximizing weight and cube advantages. Accordingly, new technologies are needed and being created, such as systems and hoisting equipment, that will expedite the transportation of containers and solve many of the problems plaguing this industry.

It is therefore desirable to provide an improved hoisting equipment, containers, and container handles, which overcomes most if not all of the problems facing this and related industries.

Continuing, freight transport continues to grow at a rapid pace, especially in the heavy-rail sector. Severe bottlenecks are seen in existing rail transfer terminals, which result in freight delays. Most such terminals have little or no right-of-way available for terminal expansion. Inefficiencies associated with moving containers from terminal to terminal by truck, to transfer between long-distance rail carriers (corridors), introduce significant delays, costs and inefficiencies. Further, truck activity on urban and suburban freeways cause increased fuel consumption and pollution emissions.

In connection with transportation logistics, market forces are driving the development of new technologies to improve the efficiency of freight transfer operations at rail terminals. A rail ThruPort, which is analogous to an airports, refers to a rail facility where Class I railroads will be able to dock and exchange freight with a high degree of automation. This transfer method can increase freight transfer efficiency. Additionally, ThruPorts can help to significantly reduce on road truck traffic associated with the current practice of moving containers, typically across town, from terminal to terminal, to make a corridor transfer from the east to the west, for example. As used herein, a ThruPort refers to an efficient operational solution in connection with a rail facility, whereby an overhead crane can be used to shuffle containers from train to train in a single step.

In connection with transportation logistics, there is a need for the development of new technologies to improve the efficiency of freight transfer operations at rail terminals.

DESCRIPTION OF A PREFERRED EMBODIMENT

Figure 1:
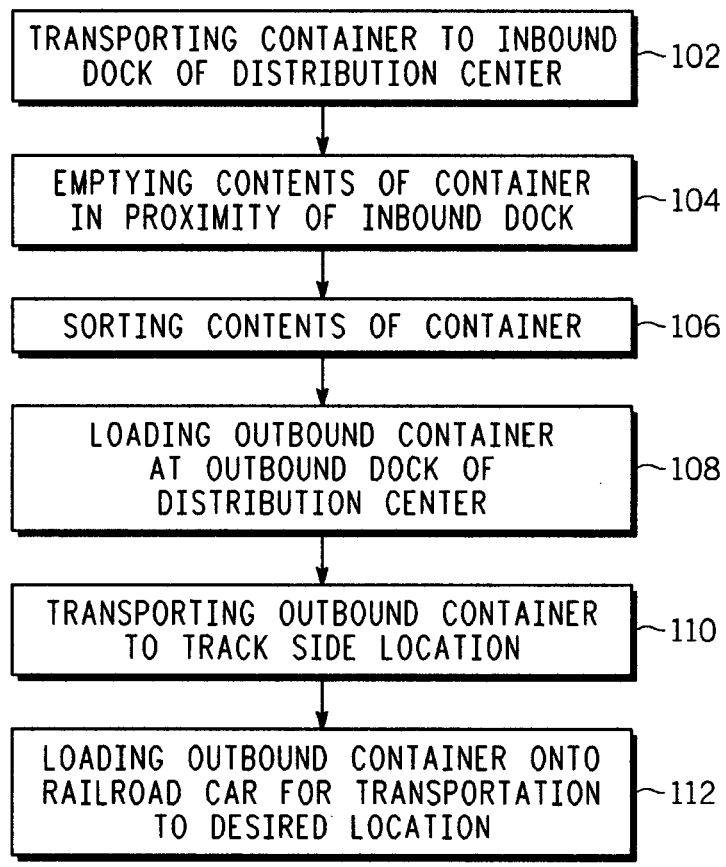
FIG. 1 is a flow diagram of an Inline Terminal, Hub and Distribution System, in accordance with the instant invention.

In its simplest form, an Inline Terminal, Hub and Distribution system and process flow diagram 100 is shown (hereafter referred to interchangeably as Inline Terminal, Inline System and/or Hub and Distribution System). Referring to FIG. 1, the system comprises the steps of: transporting 102 (hereafter the transporting or first transporting step 102) a container to an inbound dock of a distribution center; emptying 104 (emptying step 104) the contents of the container in proximity to the inbound dock; sorting 106 (sorting step 106) the contents of the container; loading 108 (loading step 108) an outbound container at an outbound dock of the distribution center; transporting 110 (transporting or second transporting step 110) the outbound container to a track side location; loading 112 (loading or second loading step 112) the outbound container onto a railroad car for transportation to a desired location. The system provides improved utilization of the available space and improved efficiency for loading and unloading of trains resulting in substantial savings in distribution and handling costs, in turn enabling rail and trucking transportation costs to be more cost competitive.

The term "container" as used herein has its common ordinary meaning, and can include any type of container, such as an ISO container, domestic container, semi-trailer, enclosure, trailer and the like, as understood by those skilled in the art. In a preferred embodiment, ISO and domestic containers with conventional corner castings work well in this system.

The terms "tractor, truck and tractor trailer" have their generally accepted meanings and are generally used interchangeably. These vehicles are used to pull, carry and/or haul containers.

The "Strip Mall" design, concept and layout provides an efficient design layout, whereby all the necessary buildings, storage, roadways, traffic flows, track placements, offices, parking and the like, are strategically placed for simplified operations and minimal unnecessary movement of containers, while striking a balance with the available real estate, as should be understood by those skilled in the art. The terminal can be owned, for example, by one entity or a number of different entities, to minimize or share operational costs and maximize efficient transportation logistics, as will be more fully appreciated from a review of the drawings and the description in this application.

The Inline Terminal or "Throughport" concept and design provides a seamless flow of cargo that requires less real estate and storage area for storing trailers and containers. An important factor relative to the Inline Terminal is that it can help to reduce handling of cargo. The Inline Terminal design is flexible in that the trackside operation can be changed in a matter of minutes to accommodate new requirements or unforeseen events (trackside ramp operations unloading and loading in and outbound trains with cargo which are stored in containers and trailers), for example.

The Inline Terminal concept also includes an integrated distribution hub center with a strip-mall configuration located on a rail intermodel property directly adjacent to a ramp operation for receiving or shipping cargo by rail in lieu of truck trailers. It also accommodates truck line carriers located on the rail premises for the purpose of utilizing the rail shipment of freight in trailers in lieu of using the highway, which will reduce the truck line operating costs, congestion on the highway, fuel consumption and poisonous gases into the atmosphere.

The Inline Terminal or through port lay out can operate all necessary functions inline (parallel to the tracks), and controls most necessary functions under an overhead crane for its operation, for inbound and outbound cargo, including temporary storage of containers at 142 with cargo, under the crane. A "strip mall" is adjacent and substantially parallel with the inline ramp operation and is typically substantially rectangular, or can be approximately 1200 ft wide by 800 ft to 2 miles long depending on anticipated volume of traffic, and is designed to be adaptable and flexible enough to expand the operating procedures depending on the anticipated volume.

The Inline Terminal design can include 15 to 20 tracks under an overhead crane with typically one or two grapplers to load and unload cargo from the tracks beneath the crane. Some of the tracks can be dedicated to certain railroad lines, such as Santa Fee, Union Pacific, Conrail, Norfolk and CSX, for example. Thus, various concourses such as tracks a and b, could be concourse one, tracks c and d could correspond to concourse two, tracks e and f could be concourse three and so forth, and in turn each concourse could relate to an individual railroad line and/or corridor. As will be appreciated, a grappler can simply pick up one to three containers from a rail car on one track (on an east corridor) and move them to a different rail car on a different track (on a different corridor, say a south corridor), on rail cars owned by the same or different railroad lines.

The terminal manager has the ability to accommodate any change in his operating volume by changing the design of the ramp operation to any trackside configuration whenever it is deemed necessary to maintain the desired flow of cargo in a matter of minutes. Changing the ramp trackside operation can be done any time of day in the event of the following:

Derailment on the main line

Equipment down (not operating)

Late inbound or outbound trains, relating to arrival and departure

Customer not picking up trailer or container within 24 hours causing undesirable congestion (terminal manager can use storage under crane without interfering with normal operation)

Late arrival of high volume customers (40 trailers or more), customers notify terminal manager that freight will be up to 3 hrs late, terminal manager can pre-block rail cars prior to freight arriving Mainline down or derailed, all inbound rail traffic will be late until main line is operating, all traffic will be blocked to enter terminal, however, with the inline terminal design, all traffic can be directed under crane when each train arrives All outbound cargo can be accommodated as soon as each railroad car is unloaded Distributor hubs can ship direct to its final destination without interchange Shortage of rail cars at trackside can now be pre-blocked, trailers or containers can be ready to load at trackside when railroad cars arrive at terminal Extra rail cars can be shipped or stored under crane Rail interchange can be transferred from one corridor to another under the crane in a matter of minutes instead of days No chassis required Movement of containers or trailers to a remote storage area is not required.

The terminal manager has a multiplicity of different operations to select from, depending on the circumstances, whether it be a late arrival outbound, an unexpected influx of cargo volume, derailment, etc. Also, the terminal manager can setup his ramp operations to a two to one, four to one, or six or eight to one track layout unloading on one side of the track leaving the unloaded trailers or containers ready for pickup at trackside and loading outbound trailers or containers on other side of the tracks.

The total requirement for real estate including all roadways, storage area, gate entry and exits, strip malls and ramp operations can vary widely, and typically can be from 800 ft long to 2 miles long and 1200 ft wide depending on volume. The Inline System can be designed with a 1200 ft wide configuration to encourage other railroad carriers who are required to transfer interchange to another corridor other than their own and now can be located as neighbors adjacent to one another to simplify interchange and the flow of traffic and still be able to operate independently from the other carriers that are all within a close proximity on the same real estate plot of land.

Conventional known terminals that are in existence today do no have any or all of the outlined advantages described herein.

The first transporting step 102, can include: entering a hub and distribution center comprising a substantially contiguous site including a plurality of train rails and a distribution warehouse in proximity to the train rails; and checking in to obtain instructions, directions, permissions, the rules of the facility and the like.

In more detail, the transporting step 102 can include: providing at least one inbound dock and at least one outbound dock on a same side or different side of the distribution warehouse; and allowing the inbound and outbound docks to be used interchangeably.

In a preferred embodiment, the terminal includes entering a terminal with a substantially centrally located entrance for the truck operator, to provide a logical, required and intuitive traffic flow in the terminal. Advantageously, this provides for ease of movement, simplicity in traffic flow and monitoring, and an intuitive roadway (simplified logistics), to allow such truck operators to check in, if needed, and enter and exit in the most efficient manner possible.

The sorting step 106 can include at least one of: moving at least some of the container contents (or cargo) to temporary storage for later loading; and loading at least some of the contents into an outbound container.

In a preferred embodiment, the sorting step 106 includes: inspecting the contents to confirm that it is not damaged; inventorying the inbound container; and documenting the results of the inspecting and inventorying steps.

In a preferred embodiment, the second transporting step 110 includes positioning and aligning the outbound container in a substantially parallel orientation with respect to and adjacent to the rail tracks by using a tractor trailer.

In more detail, the second loading step 112 can include: lifting a container in a substantially vertical and horizontal direction; transporting the container in a substantially perpendicular direction with respect to the rail tracks; and lowering the container in a substantially vertical direction onto a railroad car, in a substantially unitary step by use of a crane.

In one embodiment, the crane includes a straddle lift type crane, for example, a Translift type crane, available from MiJack Products, Inc. in Hazel Crest, Ill., for improved efficiency in loading and unloading operations.

Figure 2:
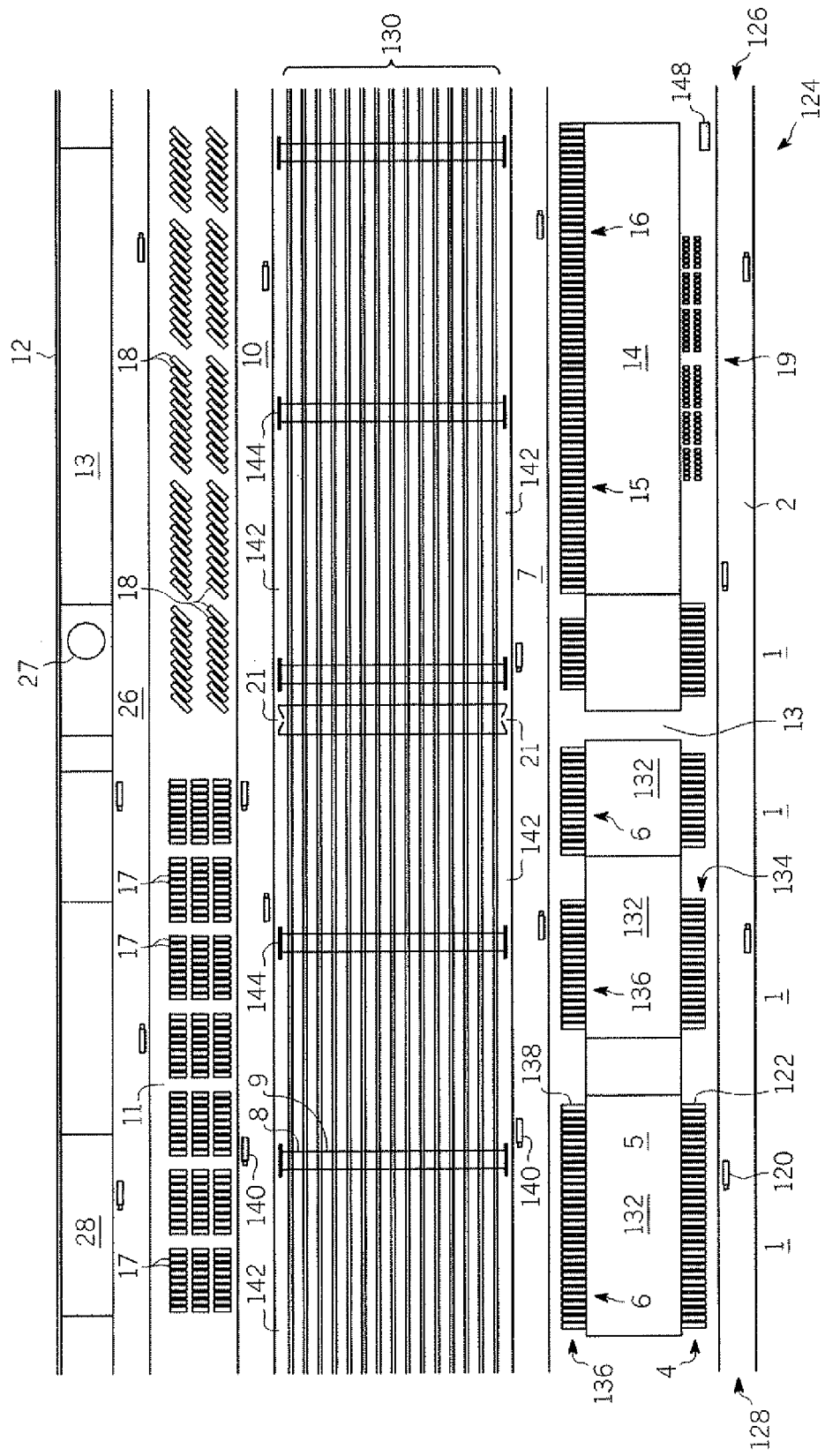
FIG. 2 is a plan view of the Inline Terminal, Hub and Distribution System, in accordance with the instant invention.

FIG. 2 is a plan view of the inline terminal, hub and distribution system 100. In more detail, a preferred hub and distribution system 100 (from ground to rail), includes: a tractor truck 120 for transporting an inbound container 122; a hub and distribution center 124 being a substantially contiguous plot of land having an entrance 126 and an exit 128, including a plurality of train rails 130 and a distribution warehouse 132 in proximity to the train rails 130; the distribution warehouse 132 including an inbound dock 134 for emptying and sorting the cargo of the inbound container 122 in proximity to the inbound dock 134 and an outbound dock 136, wherein at least some of the cargo is moved to temporary storage facilities and at least some is moved into an outbound container 138; a second tractor truck 140 for transporting the outbound containers 38 to a track side location 142, preferably immediately adjacent and parallel to the train rails; and a crane 144 for loading the outbound container 138 onto a railroad car 146 for transportation to a desired location.

The inline terminal, hub and distribution center 124 includes a check in office 148 for providing at least one or more of instructions, directions, permissions and rules to truck drivers and operators for improved efficiency.

Figure 3:
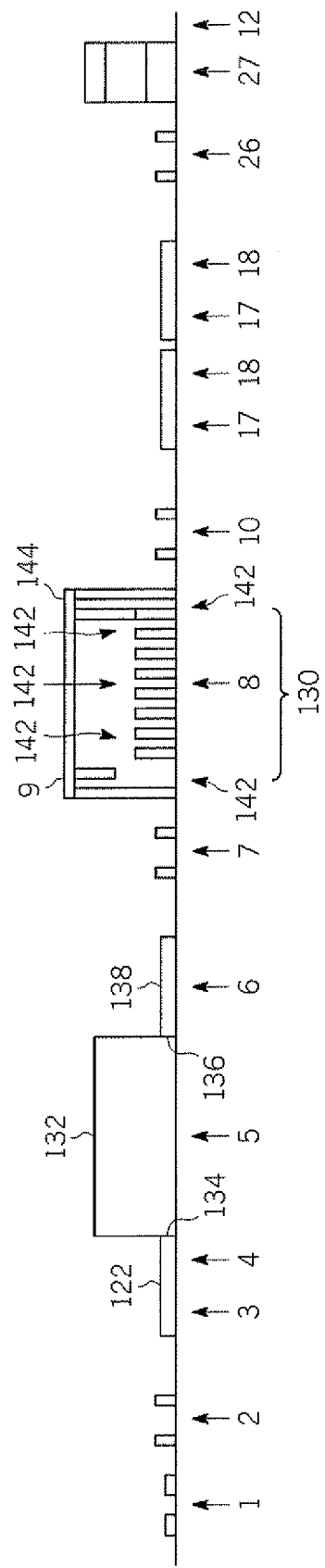
FIG. 3 is an elevation view of the Inline Terminal, Hub and Distribution System in FIG. 2, in accordance with the instant invention.

The track side location 142, as shown in FIG. 3, provides a temporary storage location, for an inbound or outbound container 122 and 138, for more efficient operations.

In a preferred embodiment, the distribution warehouse 132 includes means for sorting the cargo of the inbound container, manually or automatically with a fork lift, for example, including at least one of: means for inspecting the cargo, visually, by use of cameras, and the like; means for inventorying the inbound container, with bare code scanning, RF identification and the like; and means for documenting the results of the inspection and inventory, by means of a computing or the like device.

The first and second tractor trucks are the same or different tractor trucks with the same or different operators.

In a preferred application, the crane includes a straddle lift crane and the hub and distribution center comprises a generally long and narrow plot of land for improved utilization of the available space and improved efficiency for loading and unloading of trains.

In one embodiment, the inline terminal, hub and distribution system provides a high density and narrow-profile continuous plot (or substantially contiguous site) of land substantially adjacent and parallel to railroad tracks. The system provides improved utilization of the available space and improved efficiency for loading and unloading of trains.

The inline terminal, hub and distribution center can be a secure area, which can be enclosed with a fence and have at least one or more security gates.

The docks are constructed to provide a structure to facilitate loading and unloading of containers.

The inline terminal, hub and distribution center is designed to allow all personnel, that is, the control station and check in personnel, truck operators, crane operators, engineers, loaders, devaning (unloading) personnel and the like to work together as a team, to provide an efficient team effort and process. It is desirable to have a smooth, steady and efficient flow of trains and tractor tractors in and out of the facility.

Additionally, operators and security personnel are able to communicate with each other, using cellphones, transceivers, and the like for improved efficiencies of the operations. Thus, the various operators can communicate and/or control various equipment via land lines or wirelessly, as appropriate.

In a preferred embodiment, outdoor storage facilities for containers, positioned near the tracks are used, for improved space utilization of the available real estate.

In a preferred embodiment, straddle lift type cranes, known as Translifts, provide an efficient and unitary means of moving, picking and placing with its spreader, the containers on and off railcars, tractor trailers and the like.

It is contemplated, for example, that the unloading step can include a "just-in-time" option, comprising unloading a first container directly from the train car to a tractor trailer or vice versa (rail or street inbound), free of a storage step. This could be desirable if a container is needed right away and thus allows for expedited unloading.

The inline terminal, hub and distribution center can include storage areas on opposite sides of the track, for improved space utilization.

As illustrated in FIGS. 2-5, unloading can include unloading more than one container from the train car substantially simultaneously or at the same time, for improved efficiency.

As shown in the figures, several cranes can be used to load and unload in this operation. For example, Translift cranes typically have two grapplers on a single crane. The grappler picks up a container out of a double stack railcar and creates an empty double stack car for the second grappler to deposit two containers for interchange on the same double stack car. Stated another way, one grappler creates an empty double stack car and the other deposits one or more containers on the same car. In a preferred embodiment, using two grapplers on a single crane, is a highly efficient method of interchange. For example, if containers on a west corridor (tracks) must be transferred to an east corridor (different tracks), or vice versa, two grapplers working in harmony can significantly simplify and reduce the interchange cycle time.

As should be appreciated by those skilled in the art, having a plurality of cranes working in harmony, can provide a more efficient operation and reduces cycle time.

In the embodiment shown in FIGS. 2 and 3, a "strip mall" type warehouse hub and distribution center is shown, which is integrated into the overall inline system. In a preferred embodiment, it typically includes the following:

1. Employee parking
2. A four lane road to accommodate deliveries for inbound freight from rail to exit streets or from the street to rail.
3. A parking area for inbound freight or containers from the street delivered to inbound receiving doors or loading docks.
4. Inbound trailers or containers are parked at loading docks or overhead doors.
5. Warehouse hub distribution center, which can vary widely, such as from 50,000 to 500,000 square feet, for example.
6. Outbound trailers ready to be shipped by rail intermodal to be loaded on its designated corridor and shipped to its final destination area without an interchange
7. Four-lane road to accommodate inbound and outbound freight to and from the warehouse.
8. Straddle type crane with multiple grapplers are designed to load and unload trailers and containers for intermodal ramp operation.
9. Stackpacker overhead type crane 250 feet wide, equipped with two grapplers straddling fifteen tracks including six corridors. All tracks under the overhead Stackpacker crane are numbered on the top beam, equipped with red flashing lights indicating on which track the blue flag is removed.
10. Four-lane road to accommodate overhead ramp operation for loading and unloading trailers and containers.
11. Storage area for empty chassis and trailers.
12. Run around track or balloon track that operates the circumference of the terminal.
13. Run through lane for inbound freight approximately every six hundred feet.
14. Two hundred thousand square foot warehouse hub center with receiving and shipping facing rail intermodal, which is an optional design.
15. Outbound trailers
16. Inbound trailers
17. Empty chassis
18. Empty trailer
19. Employee's parking in rear of warehouse.
20. Blue flag controllable by the tower's rail line controller. When the blue flag is removed, red lights go on flashing and crossover gates automatically come down. The bell rings and the redlight flashes.
21. Crossover gate
22. Optional crossover by disconnecting all purpose rail cars by approximately thirty feet.
23. If and when this crossover is utilized, there will be a crossover automatic gate that will come down when the blue flag is removed.
24. Warehouse employees are typically provided keyless entry to enter and exit the terminal.
25. All truck drivers and locomotive engineers will typically switch to the towers frequency when entering and exiting the terminal.
26. Roadway
27. Operator tower typically forty by forty by fifty feet high.
28. Temporary trailer freight storage area.

Notes for embodiment shown in FIGS. 2 and 3:
Fifteen train rails are configured under the overhead crane. It has the capability of providing six dedicated corridors for all class 1 railroads, two for one design for intermodal ramp operation.
All track centers are sixteen feet wide, with a paved ground level to track. Advantageously, at sixteen feet centers, it allows enough room between rail cars to drive a Grunt (small pick up like-truck, with a high platform), to remove or install IBCs (interbox connectors). The platform is at a predetermined level, to allow a person to be at the correct level or height of a corner casting of a container, to install or remove IBCs easily.
A terminal manager has the capability to configure the ramp operation depending on the volume at the terminal.
This terminal layout illustrates the purpose of accommodating truck line carriers and warehouse hub centers, similar to single company centers, such as Walmart, who market general merchandise and who have their hub centers located on rail premises.
The amount of warehousing and layout depends on the available real estate and needs or application.
The numbers above the crane illustrate the track number. Above each number on the crane there is a light which indicates the status of the blue flag, in a preferred embodiment.

Figure 4:
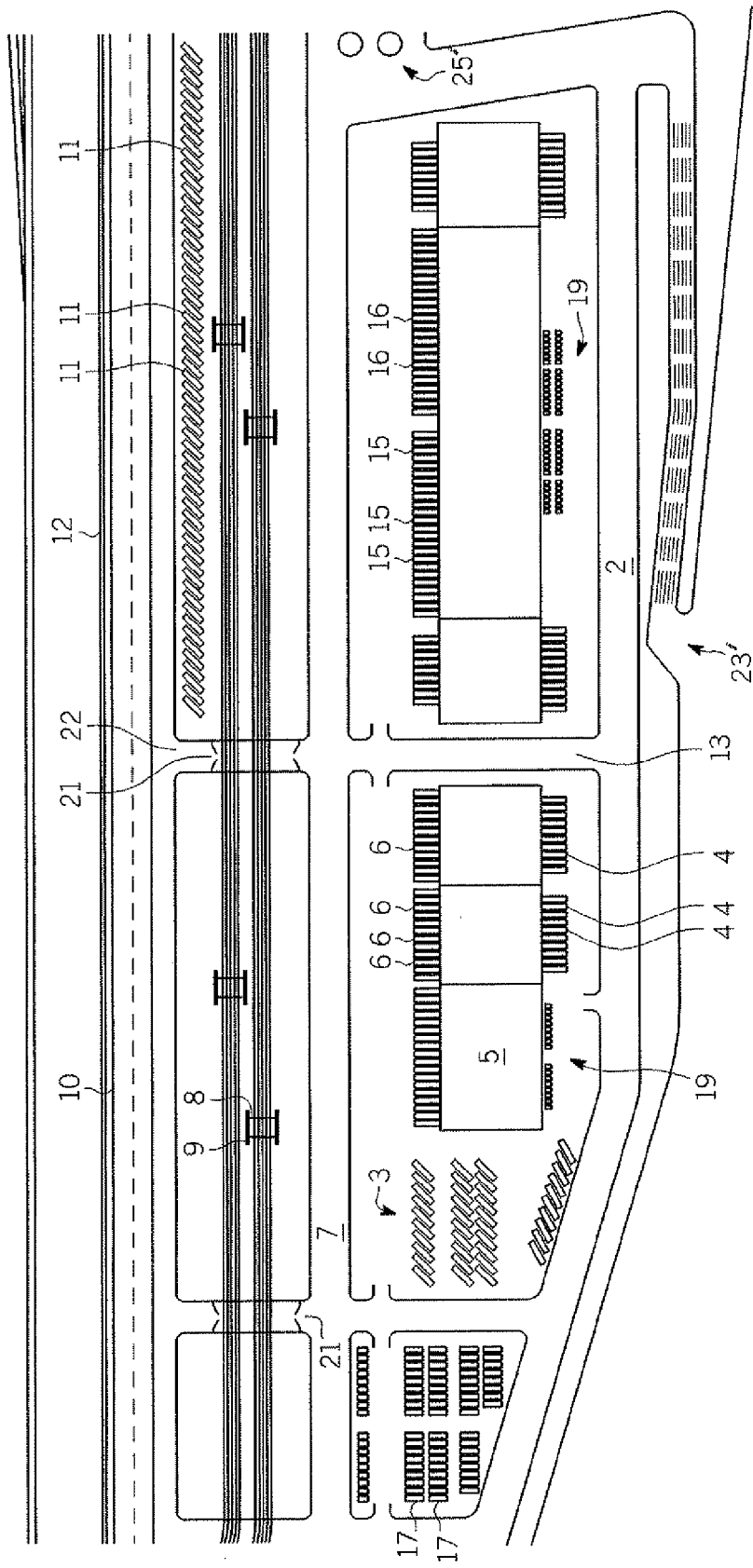
FIG. 4 is a portion of a plan view of a second embodiment of the Inline Terminal, Hub and Distribution System, in accordance with the instant invention.
Figure 5:
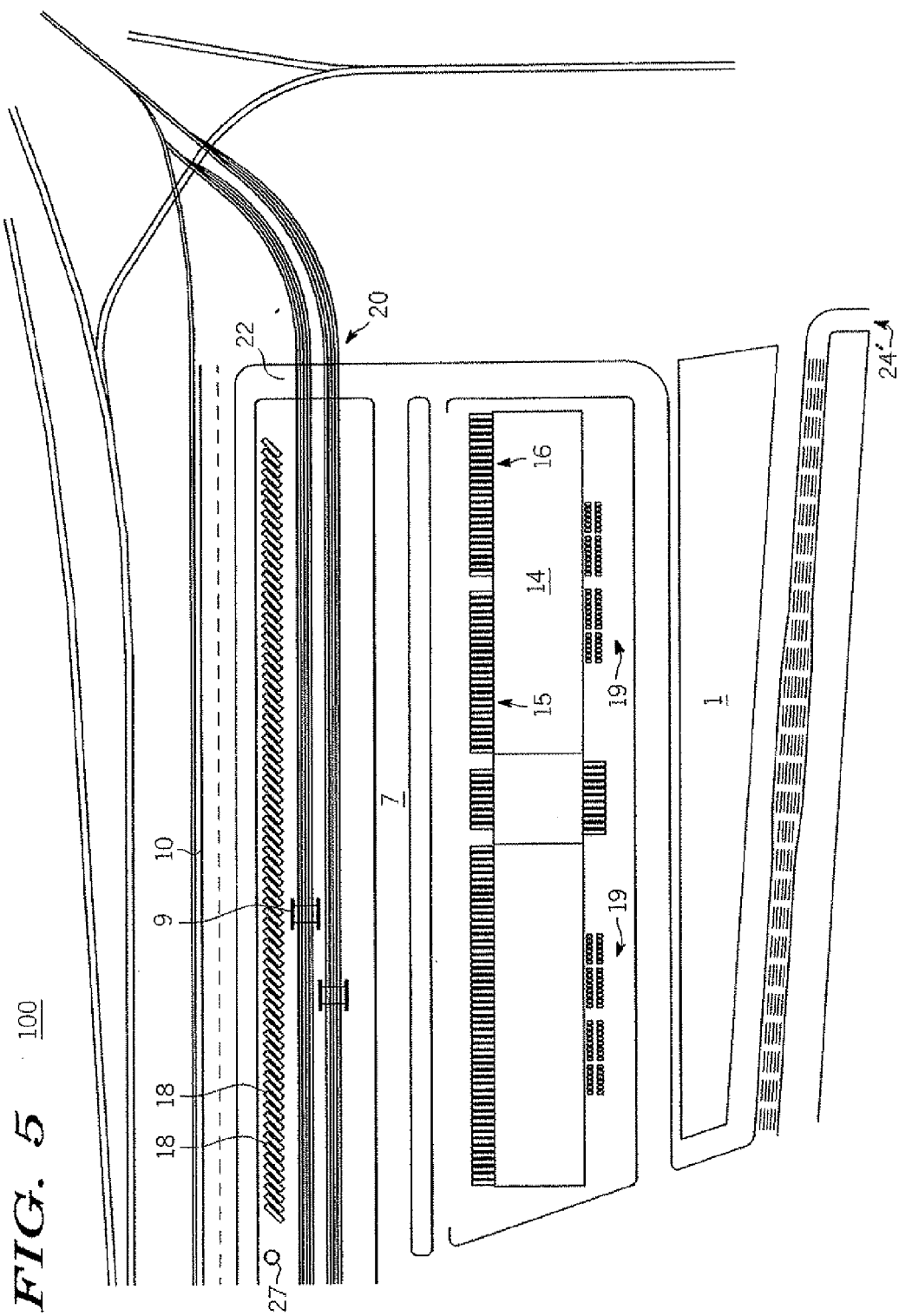
FIG. 5 is the other portion of a plan view of the second embodiment of the Inline Terminal, Hub and Distribution System shown in FIG. 4, in accordance with the instant invention.

Detailed below is an intermodal facility feature identification chart, for the inline terminal, hub and distribution center embodiment shown in FIGS. 4 and 5.
1. Facility service area and employees parking
2. Four-lane road to accommodate deliveries for inbound freight from rail and exit streets.
3. Parking area for inbound freight delivered to inbound receiving overhead doors.
4. Inbound trailers parked at overhead receiving doors for unloading.
5. Warehouse hub distribution center, typically fifty thousand to five hundred thousand square feet.
6. Outbound trailers ready to ship by rail intermodal to be loaded on the desired or designated corridor and shipped direct to final designation, preferably without the need for an additional interchange.
7. Four-lane road to accommodate inbound and outbound freight to and from the warehouse hub center.
8. Specially designed grappler to load and unload trailers and containers for intermodal ramp operation.
9. Overhead crane equipped with two grapplers straddling five tracks.
10. Four-lane road to accommodate overhead ramp operation for loading and unloading trailers and containers.
11. Storage area for empty chassis and trailers.
12. Run around track or balloon track provided around the circumference of the terminal.
13. Run through lane for inbound freight.
14. Two hundred thousand square foot warehouse hub center with receiving and shipping facing rail intermodal area, is shown in this embodiment.
15. Outbound trailers
16. Inbound trailers
17. Empty chassis
18. Empty trailer
19. Employee parking in rear of warehouse.
20. Blue flag can be controlled by the tower's rail line controller. When the blue flag is removed, red lights flash and the crossover gates automatically close or are lowered. The bell rings and the red light flashes.
21. Rail crossover gate
22. Rail crossing for inbound and outbound trailers and containers.
23'. Entrance to intermodal facility to Summit Street.
24'. Exit from intermodal facility to Summit Street.
25'. Under-pass for trailer and container traffic.
27. Control tower Detailed below are additional notes regarding the embodiment shown in FIGS. 4 and 5.
Cranes do not run under the bridge, but do operate on either side of the bridge. This note is provided in one design to be thorough in the drawings. The terminal is located below an expressway, and the bridge has little relevance to the instant invention.
Warehousing, number of tracks and cranes are shown for illustration purposes only. As should be understood by those skilled in the art, size, location and quantity may vary widely depending on the available real estate, budget, application, etc.

Figure 6:
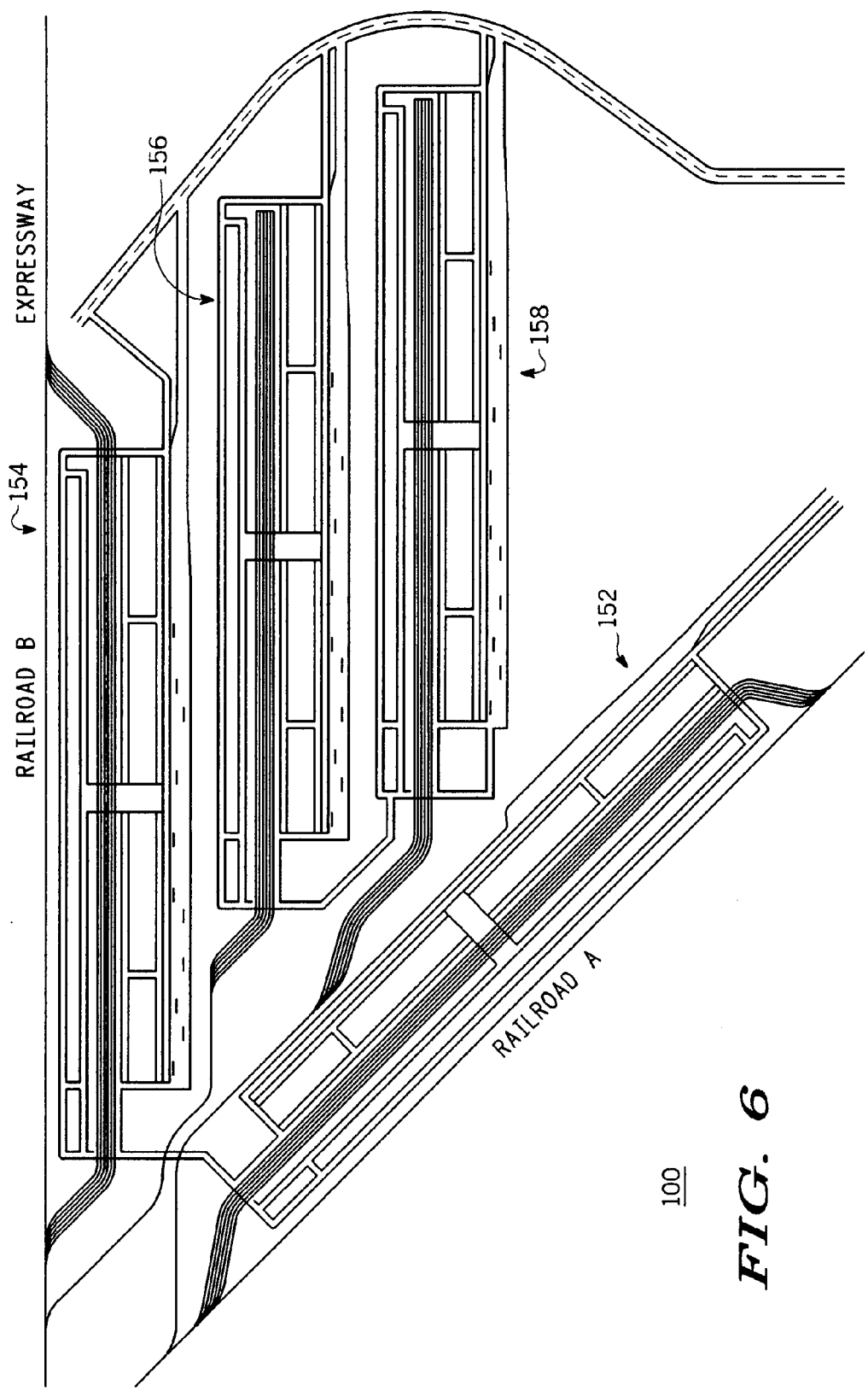
FIG. 6 is a plan view of a third embodiment of the Inline Terminal, Hub and Distribution System, in accordance with the instant invention.

FIG. 6 is a plan view of a third embodiment of the Inline Terminal, Hub and Distribution System, in accordance with the instant invention. In more detail, the system 100 includes separate individual hub and distribution systems 152, 154, 156 and 158. Each has some or all of the structure and process steps previously discussed, with respect to the other embodiments. Each system has a central roadway for entering each in a substantially central location, for improved traffic flows and traffic logistics, as discussed earlier in more detail. Again, this embodiment is strategically designed and configured with various competing constraints in mind, such as each system's individual requirements, budget and available real estate.

Figure 7:
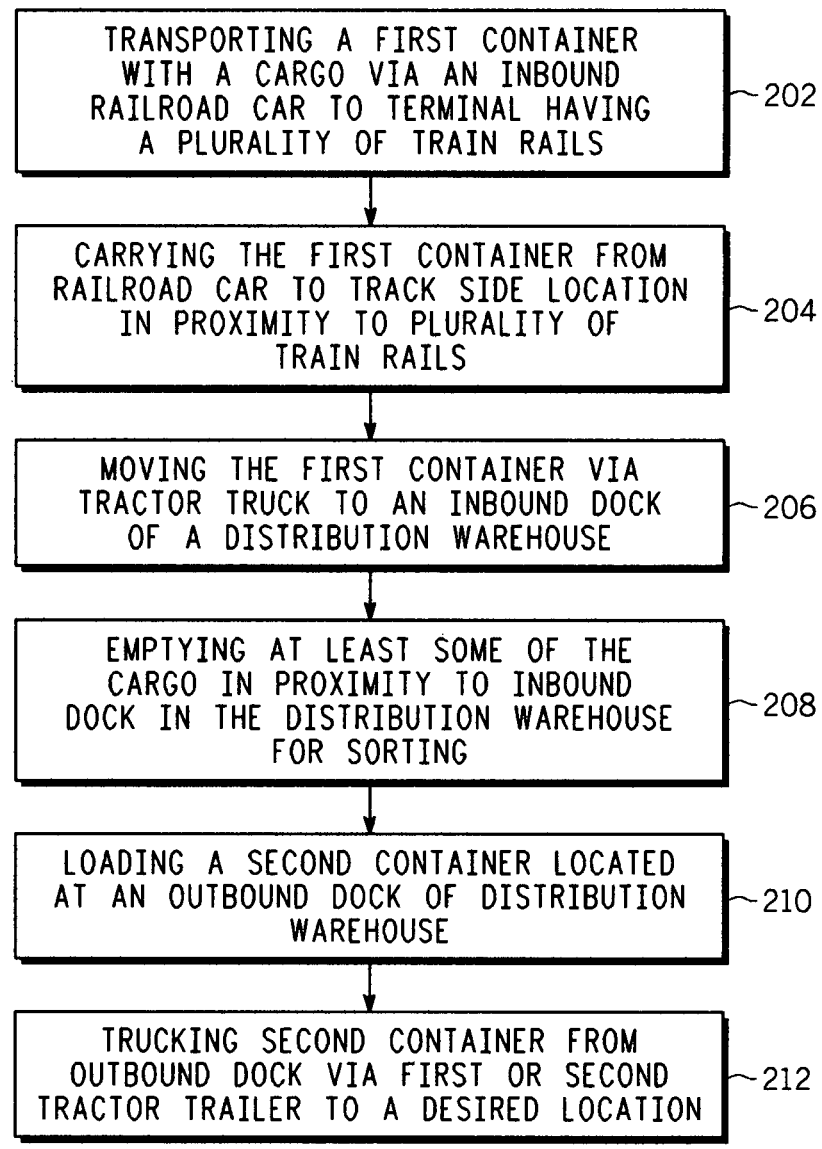
FIG. 7 is a flow diagram of an Inline Terminal, Hub and Distribution System, in accordance with the instant invention.

Referring to FIG. 7 and the previous figures, another embodiment of the an inline terminal, hub and distribution system 200 is shown. In it's simplest form, it comprises the steps of: transporting 202 a first container with a cargo via an inbound railroad car to a terminal having a plurality of train rails; carrying 204 the first container from the railroad car to a track side location in proximity to the plurality of train rails; moving 206 the first container via a tractor truck to an inbound dock of a distribution warehouse; emptying 208 at least some of the cargo in proximity to the inbound dock in the distribution warehouse for sorting; loading 210 a second container located at an outbound dock of the distribution warehouse; trucking 212 the second container from the outbound dock via the first or a second tractor trailer to a desired location. The system provides enhanced efficiency and logistics over the known art.

In a preferred embodiment, the trucking step 212 includes the second tractor trailer, entering the terminal at a substantially central location; providing a substantially contiguous site including a plurality of train rails and at least one distribution warehouse in proximity to the train rails, defining a strip mall complex; and the second tractor trailer, checking in to obtain pick up instructions and directions. This helps to provide a directed work and traffic flow in and around the terminal.

As should be understood by those skilled in the art, the inbound dock and the outbound dock can be on a same side or different sides of the distribution warehouse, and such docks can be used interchangeably. Typically, there are several docks to allow for multiple loadings and unloadings of containers, distributing and sortings of cargo and the like, substantially simultaneously, for improved efficiencies in scale.

Likewise, the emptying step 208 can include sorting and distributing the cargo in the warehouse, moving at least some of the cargo from the first container to temporary storage in the distribution warehouse for later loading; and loading at least some of the cargo into the second container or a different container.

As detailed previously in connection with an earlier embodiment, in a preferred embodiment, the emptying step 208 can include sorting the cargo, which includes: inspecting the cargo to confirm that it is not damaged; inventorying the first container; and documenting the results of the inspecting and inventorying steps. These steps are important so that one can audit the process and eliminate or minimize waste or core problems in connection with logistics, for example.

As discussed with previous embodiments, in a preferred embodiment a a strip mall complex is provided, and it includes the terminal, distribution warehouse, offices for security and terminal employees, accessible temporary container storage both indoors and outside, a series of roadways and pathways for pedestrians, maintenance shops and the like and parking, adapted to improve efficiency in transporting containers, safety and logistics of working personnel.

In a preferred embodiment, the carrying step 204 can include: lifting a container from the railroad car in a substantially vertical direction; transporting the container in a substantially perpendicular direction with respect to the rail tracks; and lowering the container in a substantially vertical direction onto the track side location, in a substantially unitary movement by use of a crane. A straddle lift crane is particularly adapted to perform this step efficiently.

As shown in FIG. 6, a plurality of terminals 152, 154, 156 and 158 are provided, and are shown clustered in general proximity to each other. This embodiment provides for customized and individualized control and distribution of fleets of containers, tractor trailers, cranes and the like. Preferably, each terminal has a strip mall complex for improved efficiencies.

Referring to the figures, in one embodiment, the system 200 includes: a terminal including a substantially contiguous plot of land having a roadway with an entrance 126 and an exit 128, a plurality of train rails 130 and a distribution warehouse 124 in proximity to the train rails 130; the distribution warehouse 124 including an inbound dock for facilitating emptying and distributing of cargo and an outbound dock, wherein the distribution warehouse 124 is adapted to allow ease of movement of cargo between the inbound and outbound docks and provide temporary storage of the cargo; a crane for carrying a container from a railroad car 146 to a track side location 142 or visa versa (discussed previously with respect to an earlier embodiment); and at least one tractor truck 140 for trucking the container from the track side location to or from an inbound or outbound loading dock or visa versa (discussed previously with respect to an earlier embodiment); and the at least one tractor truck 120 for trucking the container from the outbound loading dock to a desired location away from the terminal.

Preferably, the entrance 126 to the terminal includes a roadway strategically positioned to direct the tractor trucks to begin at a substantially centrally located position for defining a desired traffic flow in and around the terminal.

As should be understood by those skilled in the art, the terminal is adapted to accommodate a plurality of cranes, tractor trailers, roadways and movement of containers independently and in an integrated fashion, to provide a steady flow of containers in and out of the terminal. Likewise, the strip mall provides similar advantages to workers, maintenance and office personnel, pedestrians, etc.

Figure 8:
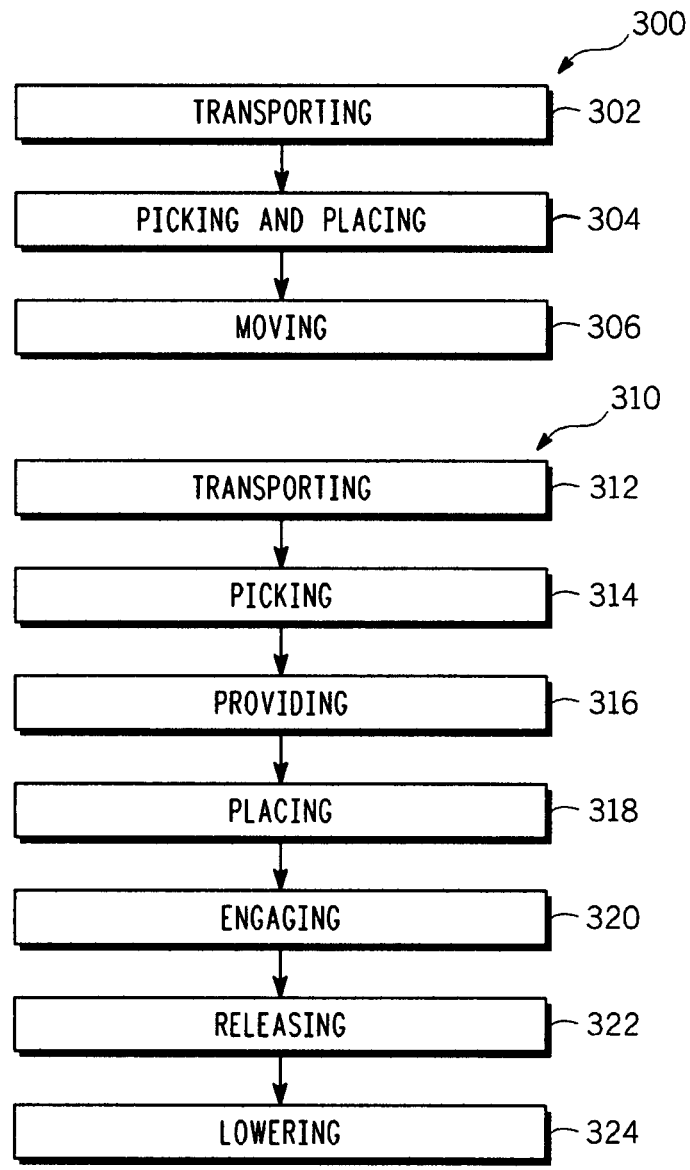
FIG. 8 is a first and second flow diagram of an Inline Terminal System, in accordance with the instant invention.

In it's simplest form, as illustrated in FIG. 8, an inline terminal system 300 is shown. It includes the steps of: (i) transporting 302 a first container with a cargo via an inbound railroad car to a terminal having a plurality of train rails; (ii) picking and placing 304 the first container from the railroad car to a track side location having at least one buffer in proximity to the plurality of train rails, including: (a) rotating the first container at an angle of at least ten or more degrees with respect to the train rails; and (b) positioning the at least one buffer substantially adjacent to the train rails, at the track side location, at an angle of at least ten or more degrees with respect to the train rails; and (iii) moving 306 the first container via a tractor truck to a desired location for unloading. This system provides a simple, robust and efficient method to load (and in the reverse unload, as discussed in more detail herein) a container on a chassis or train car, respectively.

In one application, the system can further include the steps of: moving the first container 122, in FIGS. 2 and 3, via a tractor truck to an inbound dock 134 of a distribution warehouse; emptying at least some of the cargo in proximity to the inbound dock 134 in the distribution warehouse 124 for sorting; loading a second container located at an outbound dock 136 of the distribution warehouse 124; and trucking the second container from the outbound dock 136 via the first 120 or a second tractor trailer 140 to a desired location. This provides an advantage of efficiently distributing and transporting cargo as desired.

Figure 9:
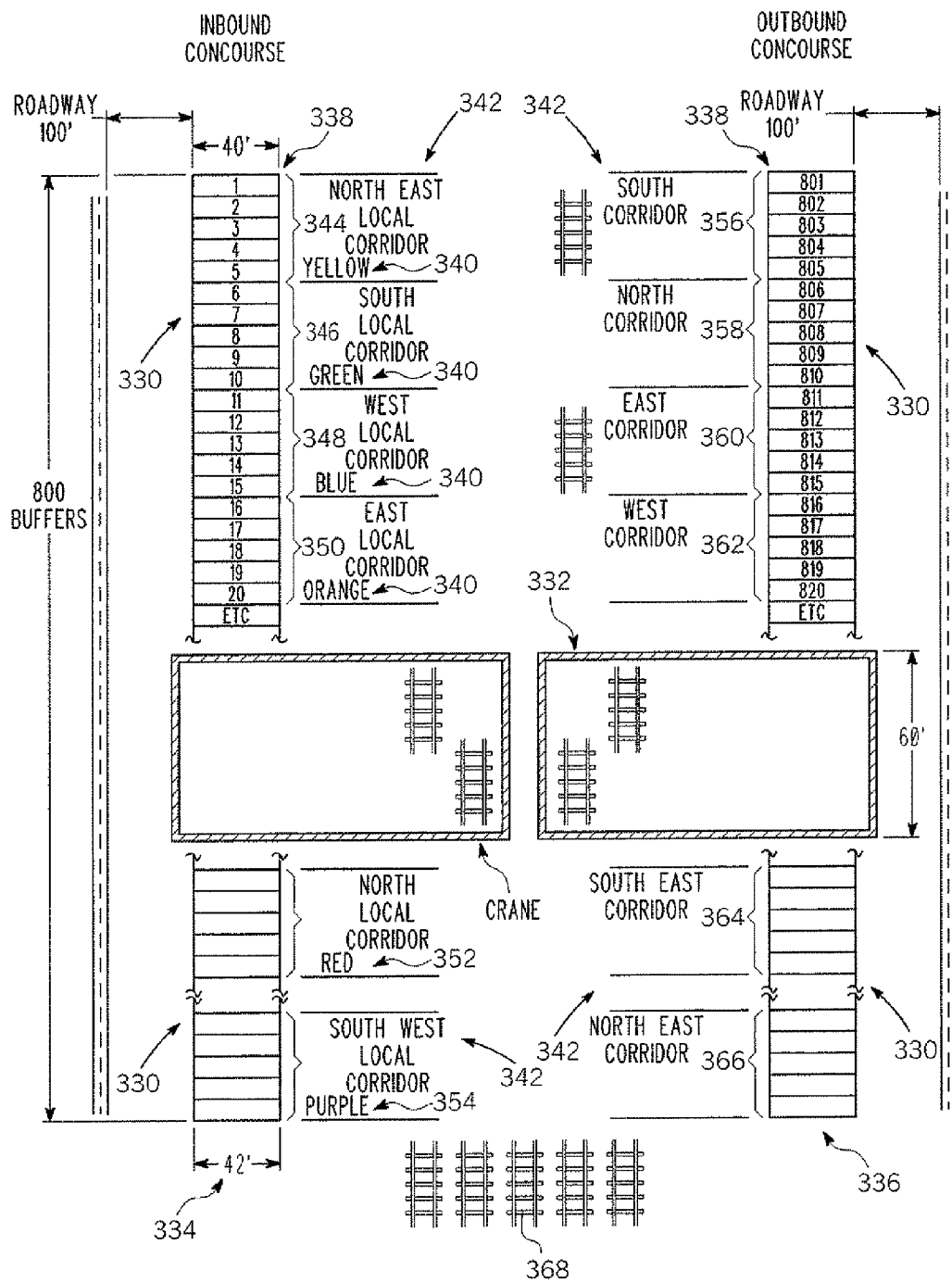
FIG. 9 is an elevation view of the Inline Terminal System in FIG. 8, showing a plurality of parallel and densely populated and adjacent buffers, substantially perpendicular to the train rails, in accordance with the instant invention.

The picking and placing step can include rotating the first container at an angle of at least fifteen or more degrees, as shown in FIG. 9, with respect to the train rails 130 and positioning a plurality of buffers substantially immediately adjacent to the train rails, at the track side location. Advantageously, at about fifteen or more degrees and providing a plurality of buffers immediately adjacent to the train rails, allows one to optimize space utilization and the available real estate, to load and unload containers in high volume with minimal use of a crane. Thus, there is less dependence on a crane and a crane operator's time. The containers can be loaded on (or unloaded from) a chassis by an operator, such as a truck driver. Thus, many operations can be accomplished substantially simultaneously, enhancing the efficiency of the terminal.

In one embodiment, in more detail the picking and placing step can include: lifting the first container from the railroad car in a substantially vertical direction; transporting the first container in a substantially perpendicular direction with respect to the rail tracks; rotating the first container at an angle of at least ten or more degrees with respect to the trail rails and aligning the first container with the at least one buffer; and lowering the first container in a substantially vertical direction onto the at least one buffer, in a substantially unitary motion by use of a crane. In a preferred embodiment, this can be accomplished by a Stackpacker, available from Mijack Products, Inc. without a need for a turntable accessory.

In yet more detail, the picking and placing step includes: positioning a plurality of buffers substantially adjacent to the train rails, at the track side location; providing the plurality of buffers at an angle of at least ten or more degrees with respect to the train rails; locating each of the plurality of buffers substantially immediately adjacent to each other; and placing each of the plurality of buffers in a substantially parallel arrangement with respect to an immediately adjacent buffer. These steps provide a very dense placement of the buffers, for improved available space utilization.

Figure 10:
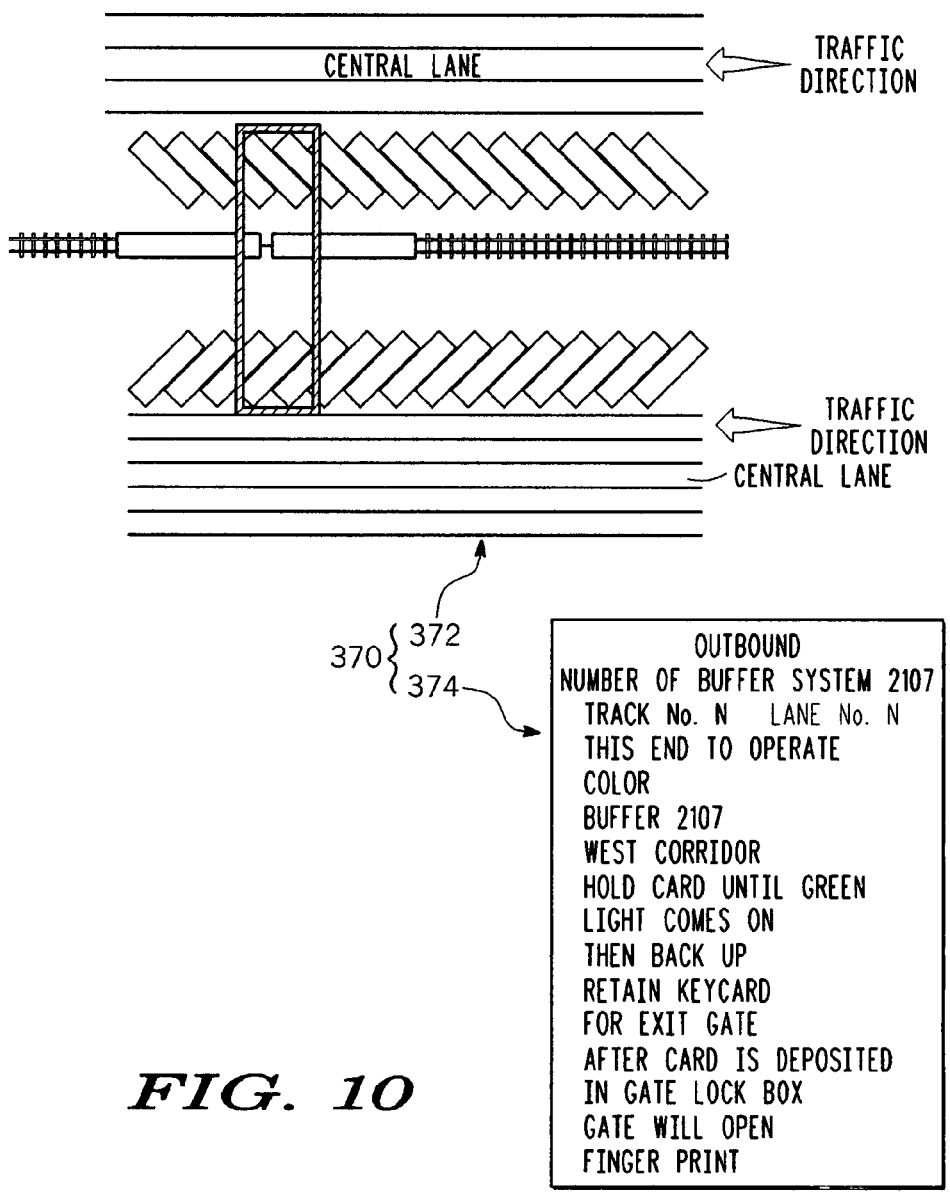
FIG. 10 is an elevation view of a swipe card, showing on the front, an embodiment of the Inline Terminal System in FIG. 8, showing a plurality of parallel, adjacent and densely populated buffers, at an angle of about ten degrees or more with respect to the train rails, and the rear provides information to a truck driver as to what buffer to go to, to pick up an assigned container to enable him or her to transport it to a desired location, in accordance with the instant invention. The swipe card provides a key to operate a certain predetermined buffer.

In yet another application, the picking and placing step includes: positioning a plurality of buffers substantially adjacent to the train rails, at the track side location; providing the plurality of buffers substantially perpendicular with respect to the train rails; locating each of the plurality of buffers substantially immediately adjacent to each other; and placing each of the plurality of buffers in a substantially parallel arrangement with respect to an immediately adjacent buffer. Likewise, these steps provide very good and very dense placement of the buffers, for improved available space utilization. In a preferred embodiment, a turntable accessory can be used to rotate the container substantially perpendicular with respect to the tracks. This turntable accessory is available from Mijack Products, Inc. and can carry and rotate a container from zero to ninety degrees, which can accommodate buffers which are placed parallel to perpendicular to the train rails, as best illustrated in FIGS. 9 and 10.

In a preferred embodiment, as shown in FIG. 8, an inline terminal system 310 can comprise the steps of: transporting 312 a first container with a cargo via an inbound railroad car to a terminal having a plurality of train rails; picking 314 the first container from the railroad car to a track side location with a crane; providing 316 at least one buffer with a containment cavity, in proximity to the plurality of train rails; placing 318 the first container into the containment cavity of the at least one buffer, by aligning and lowering the first container substantially into the containment cavity; engaging 320 the first container with support structure of the buffer at a predetermined height; releasing 322 the first container from engagement with the crane; and lowering 324 the first container onto a chassis or flat bed truck for transporting to a desired location. Advantageously, this provides a time and labor efficient loading, unloading and transporting system for cargo containers.

The placing step can include sensing proper height and alignment of the first container, prior to the latching and engaging step, for efficient placement of containers. In a preferred embodiment, this step further includes providing a signal to a crane operator to stop lowering the first container for added efficiencies.

In one embodiment, the placing step includes sensing proper height and alignment of the first container, and triggering the latching and engaging step, for further automation and repeatability and quicker operations.

In another embodiment, the placing step includes sensing proper height and alignment of the first container, and triggering the latching and engaging step, by interconnecting and engaging with bottom corner castings of the first container, for an improved and efficient operation.

Turning to the releasing step, it can include actuating twist locks of a crane to unlock and disengage with the first container, to free up the crane for the next task or lift.

The latching and engaging step can include providing a predetermined height sufficient to allow a chassis, flat bed truck or the like, to be located under the first container, for subsequent lowering and transporting to a desired location. Advantageously, this step does not require the crane or the crane operator, thus allowing a user to lower and transport the container to a desired location while a crane operator is performing a different operation, such as loading or unloading a train car or buffer, for example.

In a preferred embodiment, the system further comprises sensing at least one of height, length and alignment of the first container in the containment cavity, for improved efficiencies in operations.

In one embodiment, the lowering step includes at least one of actuating the buffer to begin the lowering step, providing a hoisting mechanism to allow raising and lowering, and releasing the support structure from lower corner castings of the first container. This allows a truck operator to transport a cargo container on a chassis or the like, away from the buffer to a desired location.

In another embodiment, as shown in the figures, an inline terminal system is shown. In its simplest form, it includes: a terminal including a substantially contiguous plot of land having a roadway with an entrance and an exit and train rails; a crane for carrying a container between a railroad car and a track side location, the track side location including at least one buffer at an angle of at least ten or more degrees with respect to the train rails; and at least one tractor truck for transporting the container between the at least one buffer and a desired location away from the track side location.

In more detail, the at least one buffer includes: a plurality of buffers substantially adjacent to the train rails, located at the track side location; the plurality of buffers being at an angle of at least about ten or more degrees with respect to the train rails; the plurality of buffers being substantially immediately adjacent to each other; and the plurality of buffers being in a substantially parallel arrangement with respect to an immediately adjacent buffer. As previously detailed, this provides a densely populated buffer arrangement to load, unload and transport containers, to a desired location.

In a preferred embodiment, the at least one buffer includes a plurality of buffers strategically positioned at the track side being clustered, aligned and in parallel, defining a multiplicity of densely populated buffers, for enhanced space utilization and an improved return on buffer investment.

In a preferred embodiment, the inline terminal system, includes: a terminal including a substantially contiguous plot of land having a roadway with an entrance and an exit and train rails; a crane for carrying a container between a railroad car and a track side location, the track side location including a plurality of buffers strategically positioned at the track side being clustered, aligned and in parallel, defining a multiplicity of densely populated buffers being positioned at an angle of about 15 degrees or more to the train rails; and at least one tractor truck for transporting the container between the at least one buffer and a desired location away from the track side location. This arrangement advantageously provides a multiplicity of densely populated buffers, for enhanced space utilization and an improved return on buffer investment.

An important factor in determining the degree of angle relative to terminal operations, is the length of track available, to accommodate double stacked rail cars.

In general, double stacked rail cars have two container delivery options. The first option is for two, 40 foot or longer containers stacked and connected on top of each other. The second option is for the double stacked rail car to deliver two, 20 foot containers in a double stacked rail car and one 40 foot or longer container on top of the two 20 foot containers stacked and connected together.

In a preferred embodiment, providing at least three substantially parallel, clustered and closely spaced buffers is an important consideration, for enhancing terminal and overhead crane operation, by reducing and minimizing the unnecessary movement of the overhead crane during the unloading and loading to and from the overhead crane to the buffers.

In terms of design considerations, there are considerations and compromises in designing the system. For example, the longer the track, the smaller the angle between the track and buffers need be, and conversely, the shorter the track (ramp operations) the larger the track-buffer angle can be, since it is desirable, to minimize unnecessary traversing, driving and movement of the overhead crane along the length of the track, while loading and/or unloading buffers and rail cars.

In a preferred embodiment, when three or more buffers are substantially parallel to the overhead crane (perpendicular to the track) or at a buffer-track angle of about ten degrees or more, the crane operator can focus on moving containers directly to or from the buffer and aligned rail car. Thus, the buffer clustering and buffer-track angle, enable the crane operator to minimize the inefficient, slow and unproductive traversing along the tracks, and allow him or her to focus on efficient loading and unloading buffers and rail cars.

Referring to FIG. 9, a plurality of parallel and densely populated and adjacent buffers 330, substantially perpendicular to the train rails 368, are shown. An overhead straddle lift type crane 332 with a spreader including a turn table accessory (not shown), would be used in this embodiment.

This embodiment provides a dense placement of the buffers, for an extremely efficient terminal operation. Thus, the dense placement advantageously provides many buffers in a relatively small space and closely positioned, to substantially maximize the number of buffers positioned close to rail tracks.

Inbound and outbound concourses, sides or terminals 334 and 336 are shown for discussion purposes. As is known, terminal operations are dynamic. Accordingly, it is understood by those skilled in the art, that what is referred to as an inbound concourse, could be used for outbound, as appropriate. Each of the buffers 330 can be associated with at least one or more identifiers, such as addresses 338, indicia such as color coding 340 and blocks 342 with numbers 344-366.

In more detail, a first block or group 344 is shown with five parallel and adjacent buffers, and includes additional indicia, such as color coding with lights, signage and/or painted yellow structure, which further can relate to a temporary destination region where the containers placed therein may be shipped.

Likewise, a second block 346 is shown with five parallel and adjacent buffers, and includes additional indicia, such as color coding with lights, signage and/or painted green structure, which further can relate to a temporary destination region where the containers placed therein may be shipped.

This is repeated for blue block 348, orange block 350, red block 352 and purple block 354 for the left side concourse 334, in FIG. 9.

This theme can also be repeated for blocks 356, 358, 360, 362, 364 and 366, at the right side concourse 336. These blocks are considered hubs and individual corridors, and can be associated with various long distant destination regions, such as south, north, east, west, south east and north east, where the containers will be blocked on rail cars and shipped, via rail cars. This design enables and provides a pre-blocking arrangement and system, for efficient terminal operations, as detailed herein. Thus, a crane operator can easily find and efficiently load (or unload) five containers, such as those with addresses 801, 802, 803, 804 and 805, on appropriate successive rail cars, so when they reach their destination, for example, the south, they are substantially together and can be easily and quickly unloaded at the desired location.

In more detail, as shown in FIG. 9, in one embodiment, a system for handling outbound containers is shown. It includes the steps of: checking in at a customer check in, either remotely or in person, and confirming container travel reservations to a desired remote destination; assigning a pathway (or buffer) address defining a gate for the customer; providing at least one of a first block and a second block of pathways, each pathway including support structure, at a track side location; and transporting and pre-blocking a plurality of containers to the assigned gate in at least one of the first and the second blocks, such that the plurality of containers with the same or similar remote destinations are substantially grouped together in a block of pathways, whereby each block of containers can be loaded to a substantially adjacent block of rail cars.

This system provides an efficient and automated pre-blocking in desired pathways adjacent to track rails, such that each pre-blocked group of containers has a similar desired remote destination, so that the containers can be easily loaded on adjacent rail cars in a block having similar desired remote destinations. Thus, pre-blocking is advantageous for loading rail cars at a terminal and blocking is advantageous for transporting to a remote destination and unloading at the remote destination. As used herein, the term block has its common ordinary meaning, and means a quantity, group or number of containers in pathways, dealt with as a unit, along a length of track rails.

Turning to FIG. 10, a key card 370 provided to a truck operator, is shown, with the front 372 providing a map of a terminal with a plurality of parallel, adjacent and densely populated buffers, at an angle of about ten degrees or more with respect to the train rails, and a rear 374, providing information, such as the location of the destination buffer where the appropriate container is to be picked up (or delivered), to enable him or her to transport it to a desired location. The key card provides a key to operate a desired buffer. As should be understood by those skilled in the art, this can be accomplished wirelessly, by use of keyfobs, phones, radios, proximity cards, smart cards, computing devices and the like or not wireless (ie. manually), by use of passwords, etc.

Figure 11:
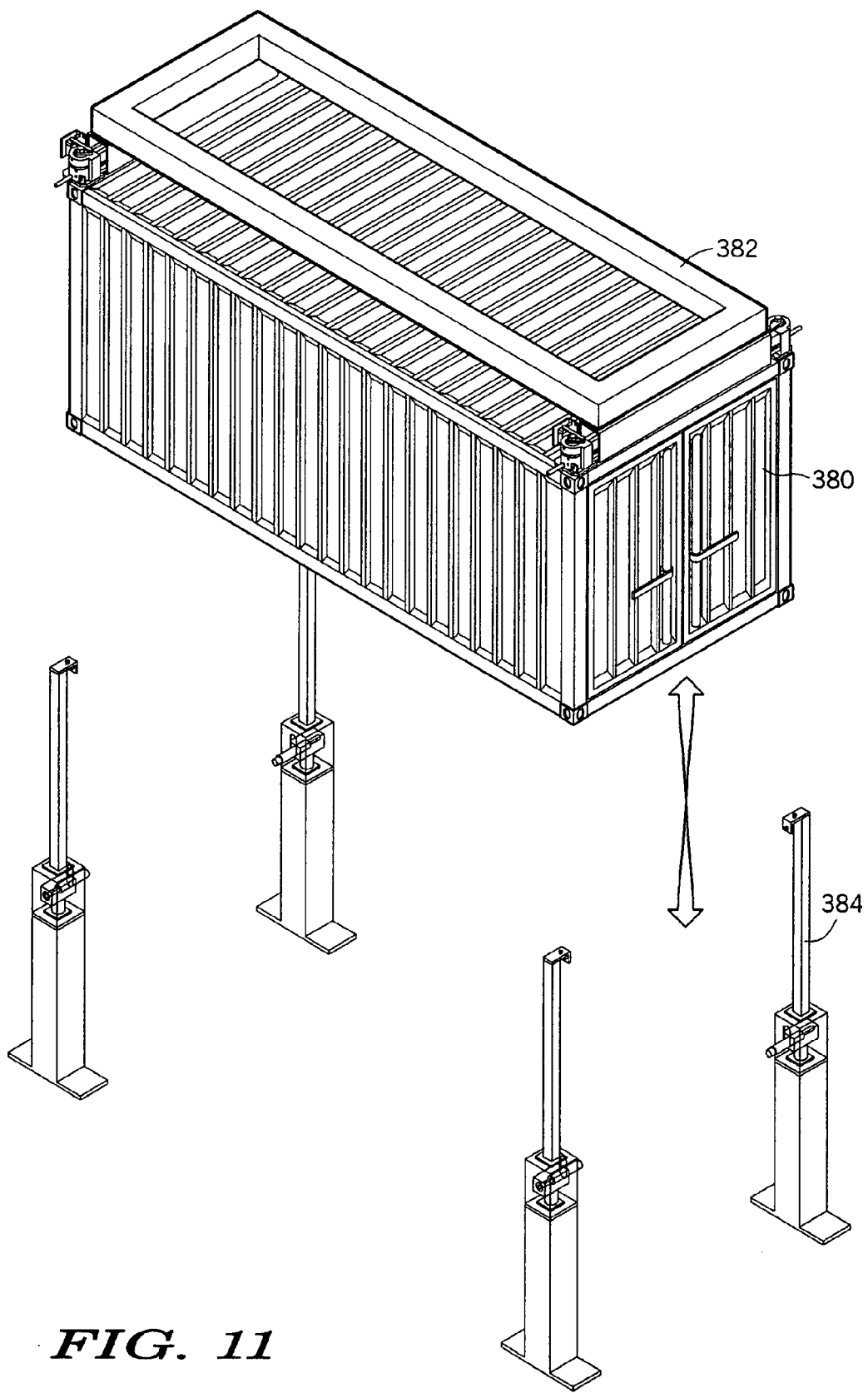
FIG. 11 is an elevated perspective view of the Inline Terminal System in FIG. 8, showing a container, which has already been picked up, being carried and moved in a position to be placed into a buffer, in accordance with the instant invention.

Referring to FIG. 11, a container 380, which has already been picked up with a crane via a spreaded 382, is shown being carried, aligned and moved in a position to be placed into a buffer 384.

Figure 12:
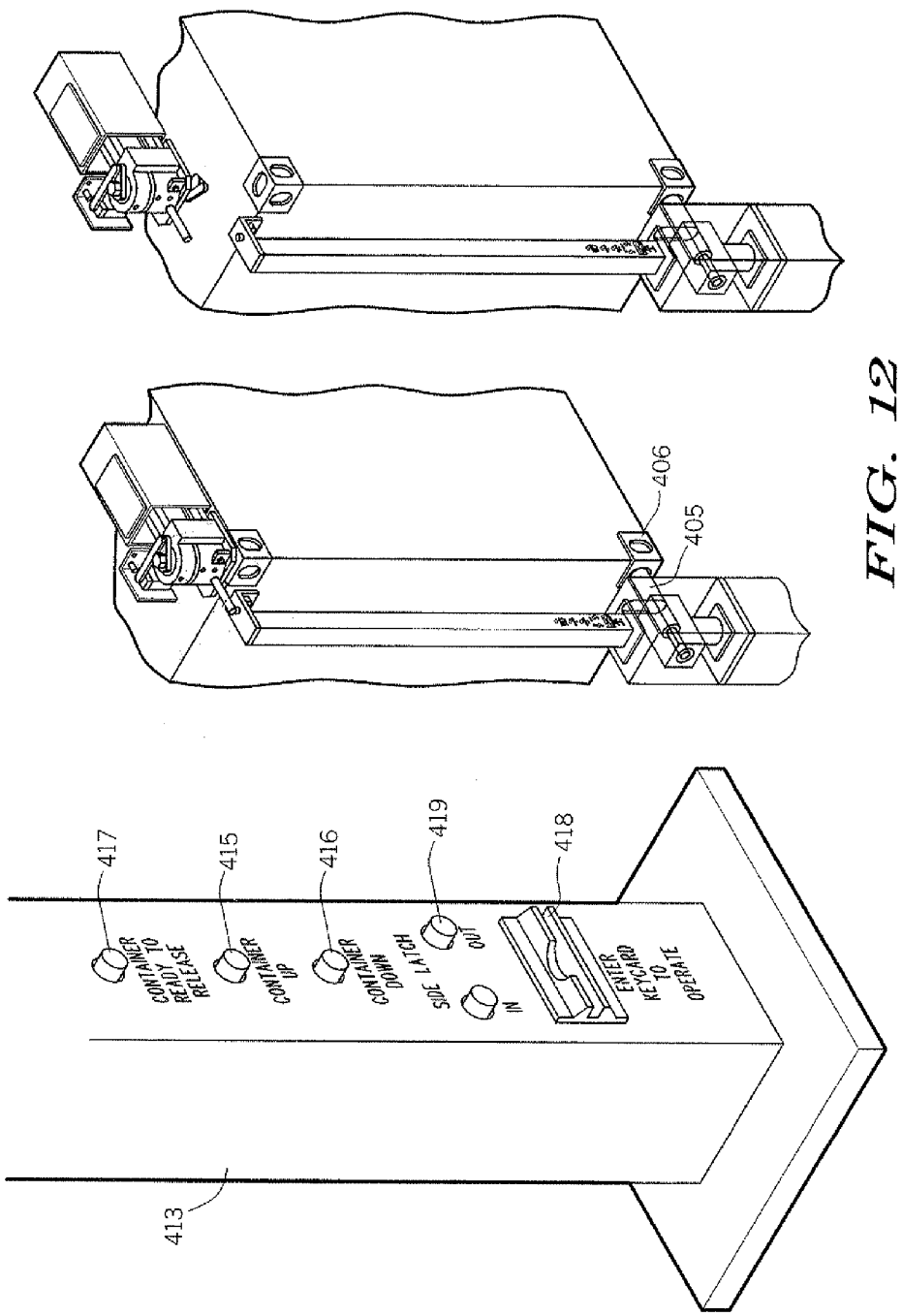
FIG. 12 is an elevated perspective view of the Inline Terminal System in FIG. 8, showing: a control pad; a container, which has already been picked and placed into a buffer, being engaged by support structure of a buffer; and being released at the top and being lowered onto a chassis (not shown), in accordance with the instant invention.

Referring to FIG. 12, the following are shown (i) a control pad 390; (ii) a container, which has already been picked and placed into a buffer, being engaged by support structure of a buffer; and (iii) a container being released at the top and being lowered onto a chassis (not shown), in accordance with a preferred system in FIG. 8. See discussion relative to FIG. 15, for more details.

Figure 13:
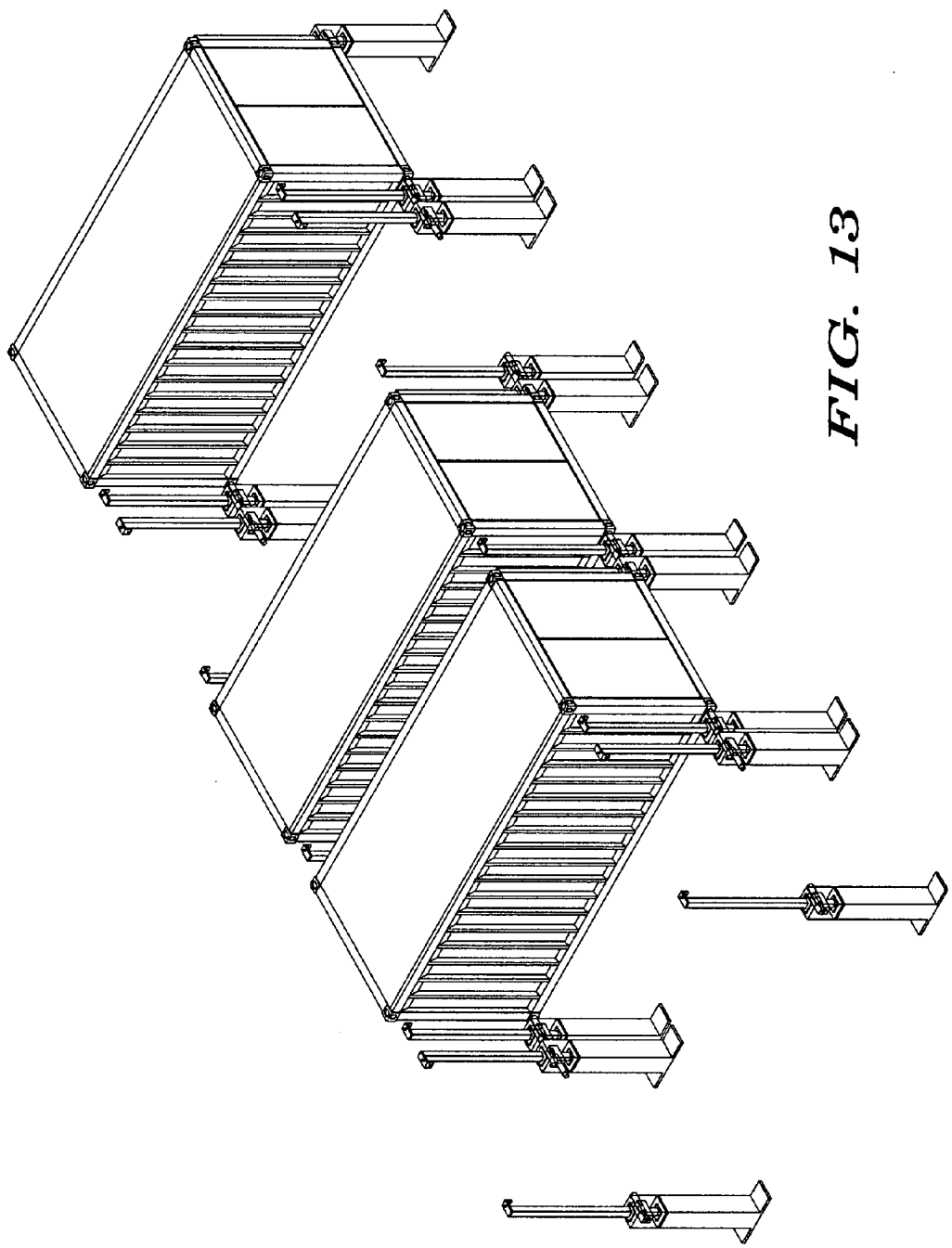
FIG. 13 is an elevation perspective view of the Inline Terminal System in FIG. 8, showing a plurality of parallel, adjacent and densely populated buffers (not illustrated, at an angle of about ten degrees or more with respect to the train rails), in accordance with the instant invention.

Referring to FIG. 13, a plurality of parallel, adjacent and densely populated buffers (not illustrated, at an angle of about ten degrees or more with respect to the train rails), is shown. This figure is illustrative for and applicable to use with distribution warehouses as well as for terminals.

Figure 14:
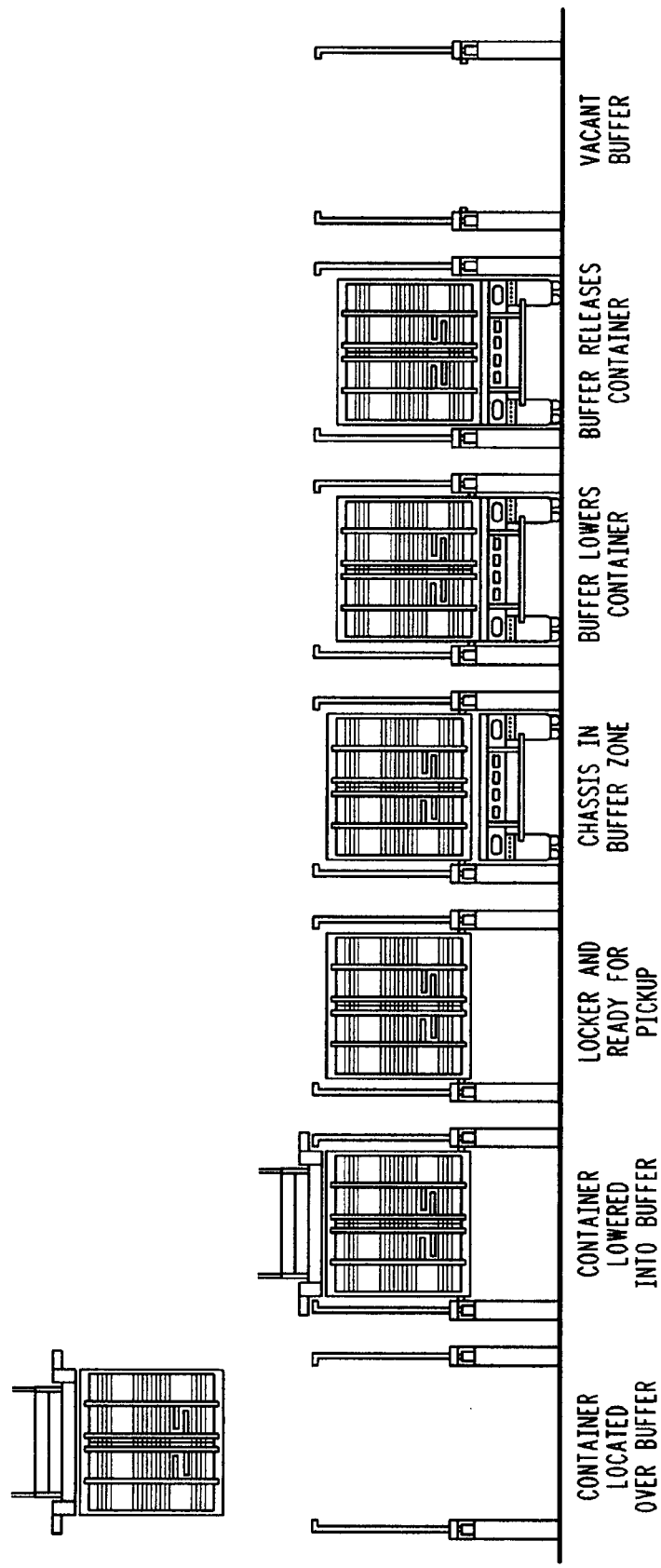
FIG. 14 is a plan view of the Inline Terminal System in FIG. 8, showing a number of views in succession, such as: (i) a container which has been picked up from a train car in the process of being moved and aligned with a buffer, after the transporting and picking steps 312 and 314; (ii) an aligned container being placed in a buffer relative to step 318; (iii) a container being engaged relative to step 320 by and being supported on support structure of the buffer and the crane having already been released relative to step 322; (iv) a chassis being placed below and in alignment with the buffer support structure, prior to the container being lowered on to a chassis as detailed in step 324; (v) the buffer support structure lowering the container onto a chassis, so as to allow the chassis to support the container, but not yet being released relative to step 322; (vi) the buffer being released from the container, so as to allow a container to be transported away to a desired location; (vii) an empty buffer being vacated by the truck driver, in accordance with the instant invention.

FIG. 14 provides operational steps and a number of "snap shot" like views in succession, relative to a preferred system in FIG. 8 and associated structure. In more detail, it shows: (i) a container which has been picked up from a train car in the process of being moved and aligned with a buffer, after the transporting and picking steps 312 and 314, in FIG. 8; (ii) an aligned container being placed in a buffer relative to step 318; (iii) a container being engaged relative to step 320 by and being supported on support structure of the buffer, and the crane having already released by the container, relative to step 322; (iv) a chassis being placed below and in alignment with the buffer support structure, prior to the container being lowered on to a chassis as detailed in step 324; (v) the buffer support structure lowering the container onto a chassis, so as to allow the chassis to support the container; (vi) the container being released by the buffer, so as to allow the container to be transported away to a desired location; and (vii) an empty buffer having been vacated.

Figure 15:
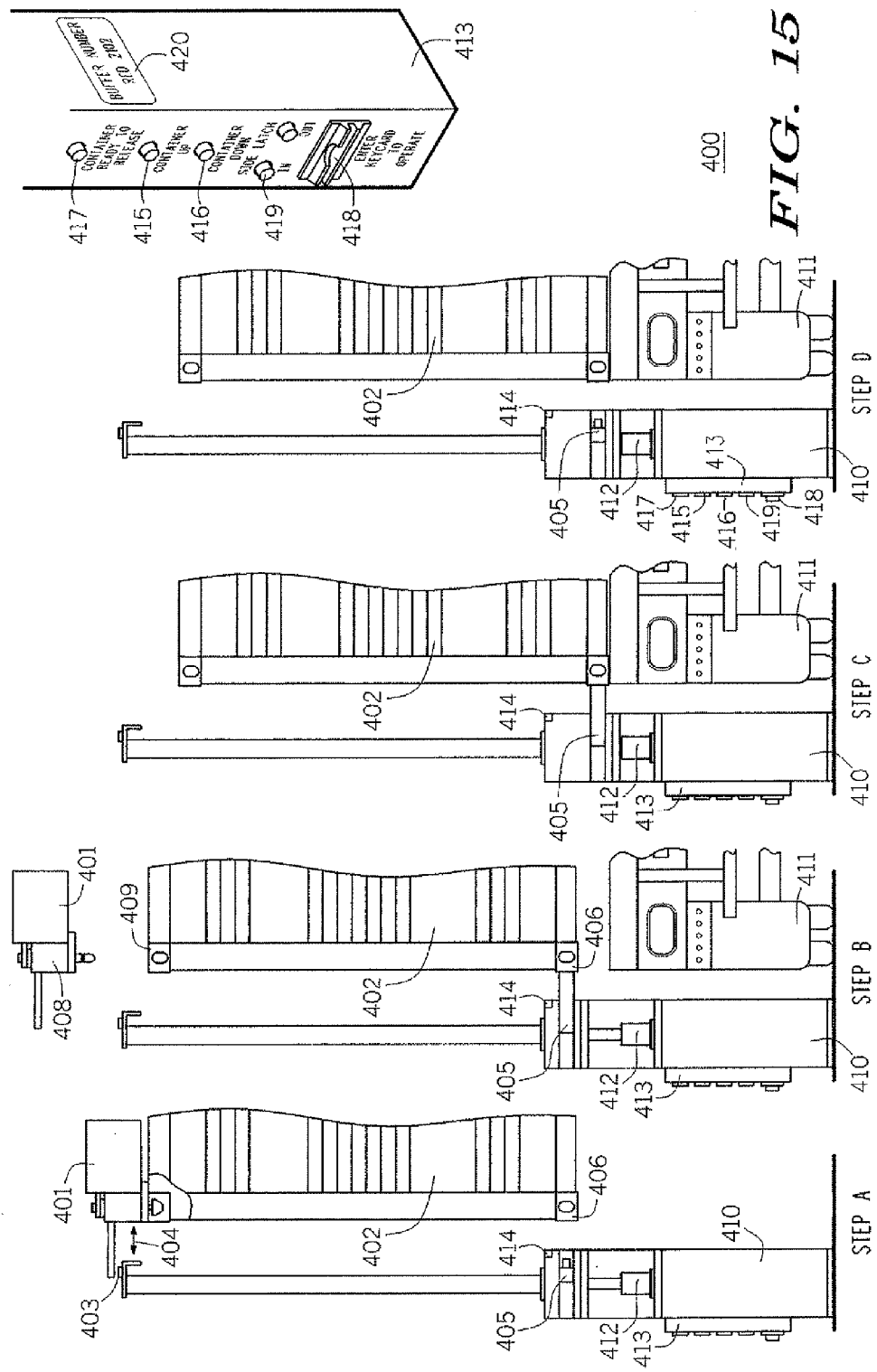
FIG. 15 is a plan view of the Inline Terminal System in FIG. 8, showing a number of views in succession, such as: (i) an aligned container being placed in a buffer relative to step 318; (ii) a container being engaged relative to step 320 by and being supported on support structure of the buffer and the crane already releasing the container, relative to step 322; (iii) the buffer support structure lowering the container onto a chassis, so as to allow the chassis to support the container, but not yet being released relative to step 322; (vi) the buffer being released from the container, so as to allow a container to be transported away to a desired location, in accordance with the instant invention.

In more detail, FIG. 15 shows selected operational steps in succession, including: (i) an aligned container being placed in a buffer relative to step 318, in FIG. 8; (ii) a container being engaged relative to step 320 by and being supported on support structure of the buffer and the crane already releasing the container; (iii) the buffer support structure lowering the container onto a chassis, so as to allow the chassis to support the container; (iv) the container being released from the buffer support structure, so as to allow the container to be transported away to a desired location.

More specifically, the series of operational steps 400 are shown in FIG. 15. In step A, a spreader 401 is in a process of lowering a container 402. In automated operation, the spreader 401 will automatically stop hoisting down when the pressure switch is actuated. A signal can be sent to the crane operator and crane circuit, to stop the lowering process. It automatically stops lowering container 402, when it contacts pressure switch 403. While lowering, twist locks 408 are engaged.

A sensor 404, such as an RFID scanning device, metal detector and the like, is positioned and configured to indicate and provide a centerline for the container 402. It has a direct relationship to the location of a bottom corner casting 406, when the spreader 401 is lowering the container 402 into the buffer support structure 410.

More particularly, during the placement and alignment process, the centerline of the bottom corner castings 406 are dictated by the centerline of the twist locks 408 and the centerline of the top corner casting 409, shown in the figures. Once the centerlines are correctly aligned and sensed, and it is determined that the container is appropriately aligned, the next phase of the operation can proceed. The dimensions are essentially standard depending on the size, length and width of the international and domestic containers.

Continuing, when the spreader 401 makes contact with the pressure switch 403, it actuates and provides a signal to each side latch 405 to engage and extend inwardly to and partially through the bottom corner castings 406 of the container 402, on all four bottom corner castings of the container 402. When all four-cylinder rods 405 of buffer 410 are engaged in the bottom corner castings 406, the twist locks 408 of the spreader 401, can be automatically disengaged and released from the top corner castings 409 of the container 402. This may be referred to as "a hand off" from the crane to the buffer. Once the rods 405 are appropriately locked into the four bottom corner castings 406, the spreader 401 with twist locks 408, is raised to perform other tasks, as shown in Step B. The buffer 410 is now in position to load the container 402 on a chassis 411 or flatbed truck.

In one embodiment, a truck operator backs the chassis 411 under the container 402, to load the chassis 411, as shown in step B. It should be noted, that in one embodiment, a truck driver may simply drive forward into a buffer.

More particularly, the hoist cylinder 412 is connected to the side latch cylinder 405, which is adapted to support a container, and in this embodiment engage the bottom corner castings 406. Once the chassis is in position for the container 402 to be loaded, as shown in step B, in a manual mode, a driver can then actuate the down hoist button 416 to lower the container on the chassis 411, as shown in Step C. Strategically placed sensors 414, shown in Step D, can be used to sense whether or not the container 402 is appropriately placed on the chassis 411. Once the container 402 is appropriately on the chassis 411, all four side latch cylinders 405 disengage the bottom corner castings 406, and an indicator, such as a green light is energized, and the driver now knows he or she can remove the keycard or swipe card and is ready to pull away from the buffer 410, to exit the terminal or distribution warehouse and to deliver the container 402 to a desired location.

The type of container that will be handled by the buffers is automatically determined by the operator of the crane and sometimes the truck driver. The operators of the crane and truck can manually control the crane or buffer, instead of using automatic control as detailed above. As should be understood, automatic controls can include RF signals communicating between the crane and the buffer.

More specifically, a control pad or manual control box 413 is available and should be located for easy access by a truck driver, for example. It typically includes: control buttons for up-hoist 415 and down-hoist 416, operating light 417, slot for keycard 418, side latch in and out control keys 419 and buffer serial number 420.

As should be understood by those skilled in the art, many of the operational steps relative to the driver detailed herein, can be automated or semi-automated and can be actuated by: use of an authentic keycard, smartcard, proximity card, radio, keyfob, cellphone, computing device (wired or wireless) and the like.

Figure 16:
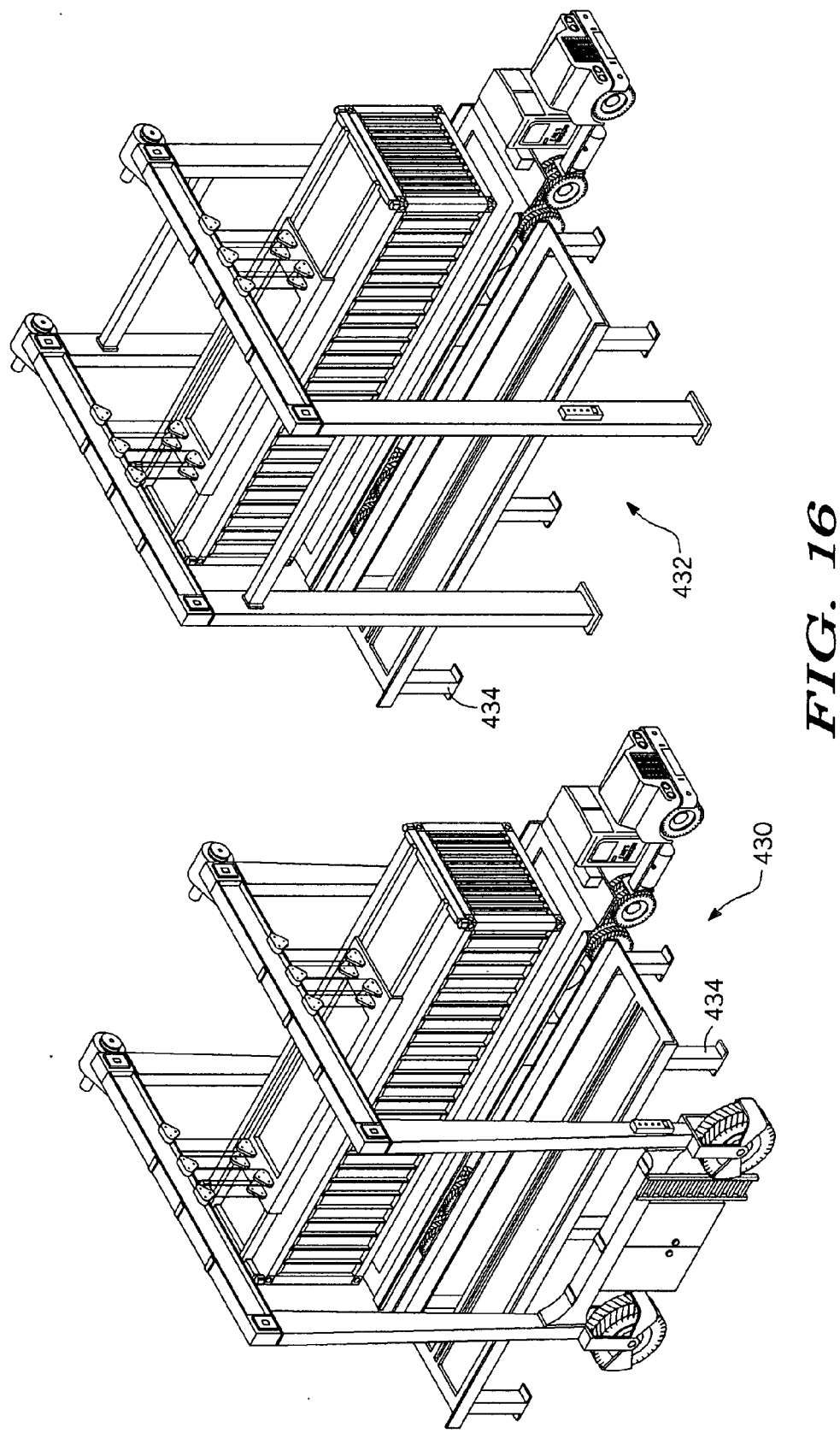
FIG. 16 is an elevated perspective view of the Inline Terminal System in FIG. 8, showing a buffer which is a portable mobile transfer station on the left and a buffer which is a stationary transfer station, in accordance with the instant invention.

Also should be understood by those skilled in the art, buffers can be substantially permanently affixed to the ground or portable and mobile, similar to as shown in FIGS. 15 and 16, for example. In a portable and mobile embodiment, for example, a mobile buffer can include rubber wheels, landing gear with stabilizing legs in proximity to the wheels and the like, to stabilize the buffer when lifting a heavy load or container. A mobile embodiment can thus have a valuable application at port terminals, as well as land based terminals, since they can be moved to a desired location.

Referring to FIG. 16, two alternative buffer embodiments are shown, which include a portable mobile transfer station 430 on the left and a stationary transfer station 432 on the right, both with passive support structures 434 (low cost models).

Figure 17:
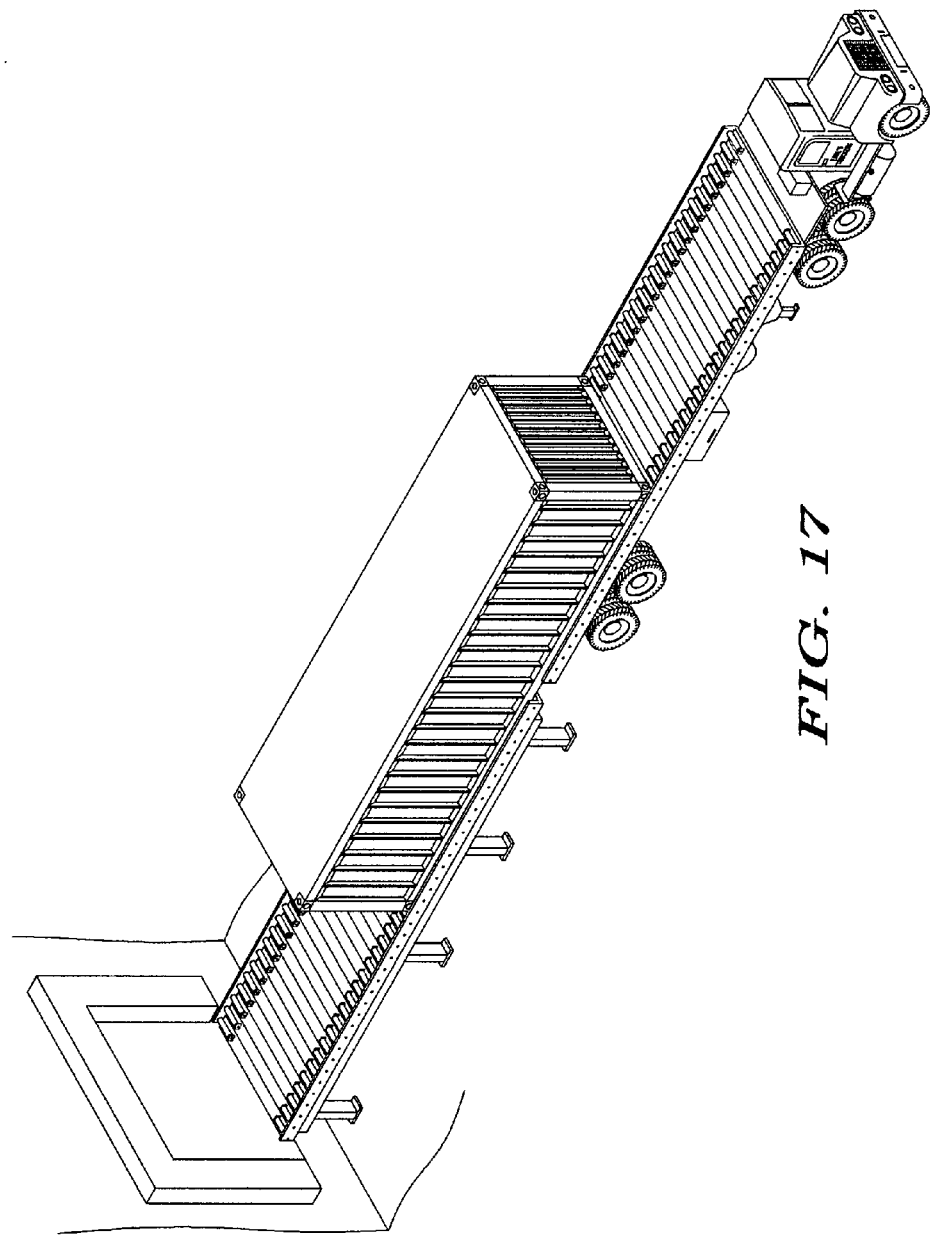
FIG. 17 is an elevation perspective view of the Inline Terminal System in FIG. 8, showing a buffer with rollers, in accordance with the instant invention.

FIG. 17 illustrates an embodiment, showing a buffer and chassis with rollers, for sliding a container to a desired position, on the buffer or chassis.

Figure 18:
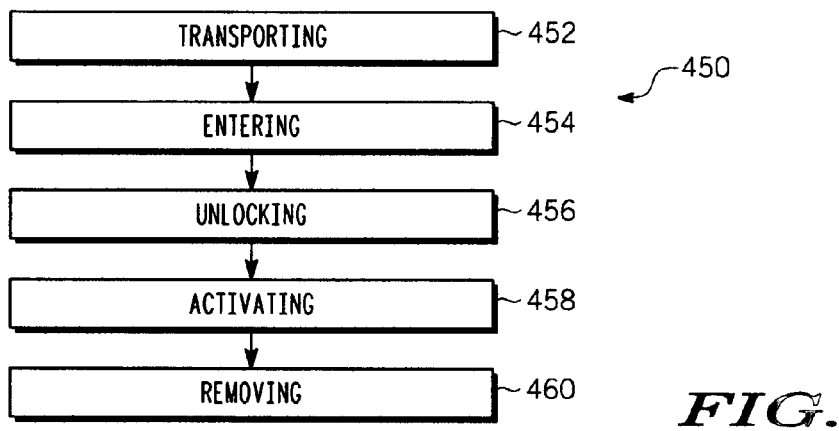
FIG. 18 is a flow diagram of a Distribution System, in accordance with the instant invention.

A distribution system 450 is shown in FIG. 18. In its simplest form, it includes the steps of: transporting 452 a container on a chassis of a tractor trailer to a loading dock; entering 454 a buffer having a support structure; and raising the container with the support structure a sufficient amount to allow the chassis to be removed while allowing the container to remain. This provides an efficient method of delivering, loading and unloading containers in a "self serve" like manner, freeing up a truck operator and dock personnel to work independently.

In a preferred embodiment, it can further include: emptying the contents of the container; sorting the contents of the container; loading an outbound container at an outbound dock of a distribution center; transporting the outbound container to a track side location; loading the outbound container onto a railroad car for transportation to a desired location. This is particularly advantageous in connection with rail terminals.

In a preferred embodiment, the distribution system 450 in FIG. 18, includes the steps of: transporting 452 a container to a dock of a distribution center via a tractor trailer; entering 454 a buffer having a containment cavity; unlocking 456 a plurality of twist locks connecting the chassis and container; actuating 458 the buffer to raise the container above a chassis of the tractor trailer; and removing 460 the chassis from the containment cavity while allowing the container to remain. The system allows a truck operator and dock personnel to work independently. Also, see FIG. 15 in the following order Step D, Step C and Step B. The spreader 401 and upper portion of the support structure supporting the pressure switch 403 would not be required in this system.

Preferably, prior to the actuating step, the system includes: sensing proper alignment of the container with respect to the support structure; and engaging the container with the support structure, for reliable operation. Thereafter, a locking step can be utilized, to lock the container to the buffer, for after hour deliveries, for example, by a truck operator.

In another application, as shown in FIGS. 2, 3, 13 and 15(Steps D, C and B), a distribution system is shown. It includes: a distribution warehouse including an inbound dock for emptying and sorting cargo of an inbound container and an outbound dock for loading cargo into an outbound container; at least one buffer in at least one of the inbound and outbound docks, comprising an active support structure having a containment cavity adapted to allow receipt and removal of a container, the active support structure being moveable and being adapted to support a container in a raised position above a chassis and a lowered position for placement of the container on a chassis; and a first tractor truck adapted to transporting an inbound container to the buffer and a second tractor truck adapted to transporting the outbound container to a desired location, the first and the second tractor trucks being one or more tractor trucks. Likewise, this system allows a truck operator and dock personnel to work independently.

Preferably, the distribution warehouse includes at least one of: facilities for sorting and inventorying cargo; and the at least one buffer includes a plurality of buffers in a substantially parallel and adjacent arrangement. Densely populating buffers allows many buffers to be placed in a small area, for improved productivity.

Technical Description Relative to Pre-Blocking

Figure 19:
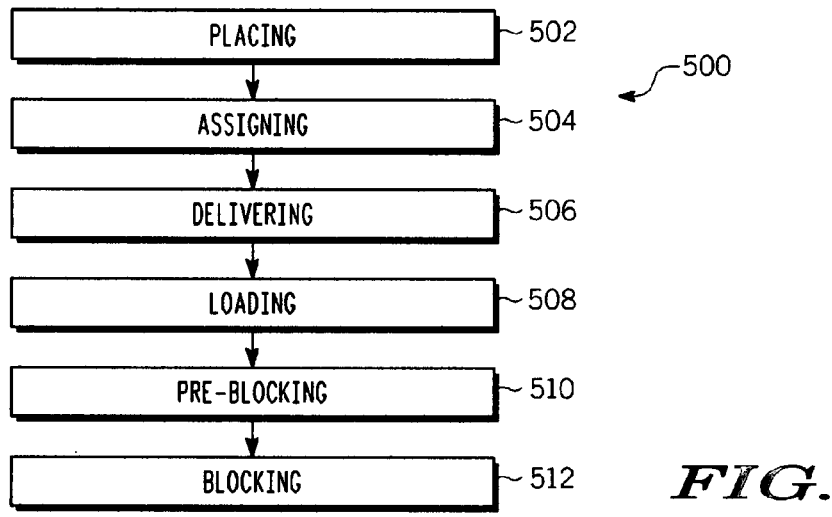
In FIG. 19, a flow diagram of an Inline Terminal System, in accordance with the instant invention.

In FIG. 19, a flow diagram of an inline terminal system 500, is shown. In its simplest form, it includes the steps of: placing 502 container travel reservations to a desired remote destination with customer service; assigning 504 a corridor directing the customer as to where to deliver the container including a block of pathways; delivering 506 the container to one of the pathways in the corridor, at a track side location; and loading 508 the container on a support structure of the pathway in the corridor.

This system provides an efficient, effective and semi-automated pre-blocking method, such that each pre-blocked group of containers has a similar desired remote destination, so that the containers (ie. see FIG. 9, corridor 356) can be easily loaded on adjacent rail cars in a block having similar desired remote destinations. Thus, pre-blocking is advantageous for loading rail cars at a terminal and blocking is advantageous for transporting to a remote destination and unloading at the remote destination.

In addition, pre-blocking, as provided herein, can decrease terminal personnel down time searching for lost or misplaced containers, possibly in storage, reduce blocking errors and provide a disciplined process, requiring a driver to deliver a container at a designated corridor or address, rather then simply dropping it off in a storage area of a terminal. Thus, proper pre-blocking can result in less down time searching for containers and lower chance of human error in improper or erroneous blocking.

As used herein, the term block has its common ordinary meaning, and means a quantity, group or number of things, such as containers in pathways, rail cars and the like, dealt with as a unit.

The terms buffer, pathway and pathfinder are used interchangeably, are generally synonymous and have their common ordinary meaning and relate to certain structure and steps, in connection with the instant invention, as more fully detailed herein.

In a preferred embodiment, the system 500 can include: pre-blocking 510 a plurality of containers, by populating the corridor (FIG. 9) with containers having a common desired remote destination; and blocking 512 the pre-blocked containers on a substantially adjacent block of rail cars. This process provides an efficient method of loading and blocking rail cars. Subsequently, the blocked containers are transported in a block of rail cars to a common desired remote destination.

As should be understood, there can be many blocks which can be delivered to various terminals during a delivery route. For example, in one embodiment, assigning a second block, defining a second corridor, for populating with containers having a common second desired remote destination, and pre-blocking and populating the second corridor, is possible. Advantageously, the pre-blocked containers can be loaded on a block of rail cars, thus each block can be delivered, unloaded, decoupled and the like, as appropriate during a route.

Containers are generally loaded in tubs or wells of railcars. Various loading and blocking arrangements and alternatives are possible. For example, two small containers (i.e. about 20 feet long) can be placed in a tub, in a side by side arrangement at the bottom, with a large container (i.e. about 40 feet long) placed above them or two large containers can be placed above each other. A railcar can typically have up to five wells, thus containing 10-15 containers when fully loaded and/or blocked in a desired manner. Advantageously, pre-blocking and then blocking or appropriately populating the railcars, provides a quick and reliable blocking process, since much of the picking and placing involves trolleying of a spreader between corridors and adjacent railcars (blocked or to be blocked), and less desirable traversing along the tracks, for improved efficiencies. One or more indicators, such as stop lights and the like, can be used to indicate where a train operator is to stop the train, for aligning certain corridors with desired blocked or to be blocked railcars, for increased efficiencies and coordination.

In a preferred embodiment, concourses 334 and 346 with corridors for use with interchangeable inbound and outbound traffic are shown in FIG. 9. More specifically, a multiplicity of corridors 344, 346, 348, 350, 352, 354, 356, 358, 360, 362, 364, 366, are shown substantially parallel to the train rails 368 and are positioned at a track side location, the pathfinders (buffers, pathways) can include an angle of at least about ten degrees with respect to the train rails (shown at ninety degrees in FIG. 9), the pathfinders can be substantially immediately adjacent to each other in each corridor, and the pathfinders can be placed in a substantially parallel arrangement with respect to an immediately adjacent pathfinder, for example items 1-5, in the corridor 344. This feature and structure allow the terminal to be efficiently used and densely populated.

As shown in FIG. 15, the feature of loading and populating a pathfinder, by: actuating and raising the support structure of the pathfinder, to raise the container sufficiently to allow a customer to remove a chassis which supported the container, from the pathfinder while allowing the container to remain, defining a hand off, is shown generally by Steps D, C and B, as previously discussed. A quick and reliable hand off facilitates container loading and unloading logistics. For example, sensing proper alignment of the container with respect to the support structure; and engaging the container with the support structure, prior to the loading step, contributes in this regard. In addition, an embodiment for sensing at least one of height, length and alignment of the container in a pathfinder, can assist in contributing to automating and enhancing the reliability of the system.

As should be understood, a customer or truck operator will need to unlock a plurality of twist locks connecting the chassis and container, prior to the loading step.

In a preferred embodiment, by providing each corridor 344, 346-366 with pathways being clustered, aligned and in parallel, corridors capable of being densely populated are provided. This contributes to efficient and reliable loading on rail cars requiring minimal crane operations, often involving trolleying, rotating and lifting of the spreader, and minimally requiring movement and transporting the crane longitudinally along the tracks, for maximum crane efficiency.

In one embodiment, as shown in FIG. 9 and the other figures, an inline terminal system is shown. In its simplest form, it includes: a terminal including a substantially contiguous plot of land and train rails; a computing system for receiving container travel reservations to a desired remote destination associated with customer service and assigning a block of pathways, defined as a corridor, directing the customer as to where to deliver a container; at least one motorized vehicle capable of transporting the container to the corridor, at a track side location adjacent to the train rails; at least one concourse located track side including a plurality of corridors with pathways having support structure adapted to receive containers in the corridor and provide pre-blocking in a desired corridor, the corridors being located and constructed to facilitate blocking of containers on rail cars.

This system provides an efficient, effective and semi-automated pre-blocking arrangement, such that each pre-blocked group of containers (corridor) has a similar desired remote destination, so that the containers can be easily loaded on adjacent rail cars in a block. Thus, providing a pre-blocking arrangement is advantageous for loading rail cars and blocking is advantageous for transporting to various locations relative to a delivery route.

In a preferred embodiment, a crane in included for carrying containers between a rail car and individual pathways and the block of pathways are substantially clustered, aligned and in parallel, defining a corridor adapted to be densely populated.

Figure 20:
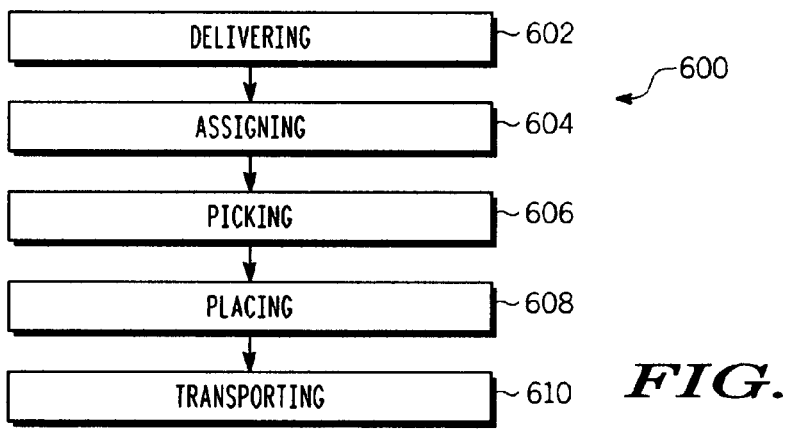
FIG. 20 is a flow diagram of an embodiment of a Hub and Distribution System, in accordance with the instant invention.

In another embodiment, a hub system 600 is shown, for example, in FIGS. 20 and 9. It comprises the steps of: delivering 602 a container via rail to a terminal; assigning 604 a corridor as to where to deliver the container, the corridor including a block of pathways in proximity to a track side location; picking 606 the container from a rail car and placing 608 it in one of the pathways in the corridor; and transporting 610 the container to a desired remote destination. The system provides an efficient, effective and semi-automated post-blocking method (or after containers have been blocked on rail cars) and corridor, such that each post-blocked group of containers has a similar desired remote destination, such that the containers can be easily located, loaded (ie. pathway-hauler hand off) and transported to a desired location.

In a preferred embodiment, the hub 600 further comprises: populating the corridor, for example corridor 344, with a block of containers 1-5, having a desired remote destination, as shown in FIG. 9. In one example, the transporting step 610 can include hauling at least one of the blocked containers 1-5 in FIG. 9, via a motorized vehicle, to a desired remote destination. In more detail, the hub system 600 can include providing the block of pathways in a substantially clustered, aligned and parallel arrangement, defining a block of densely populated pathways, for efficient hauling from a corridor 344 to a local north east location, for example in FIG. 9.

Figure 21:
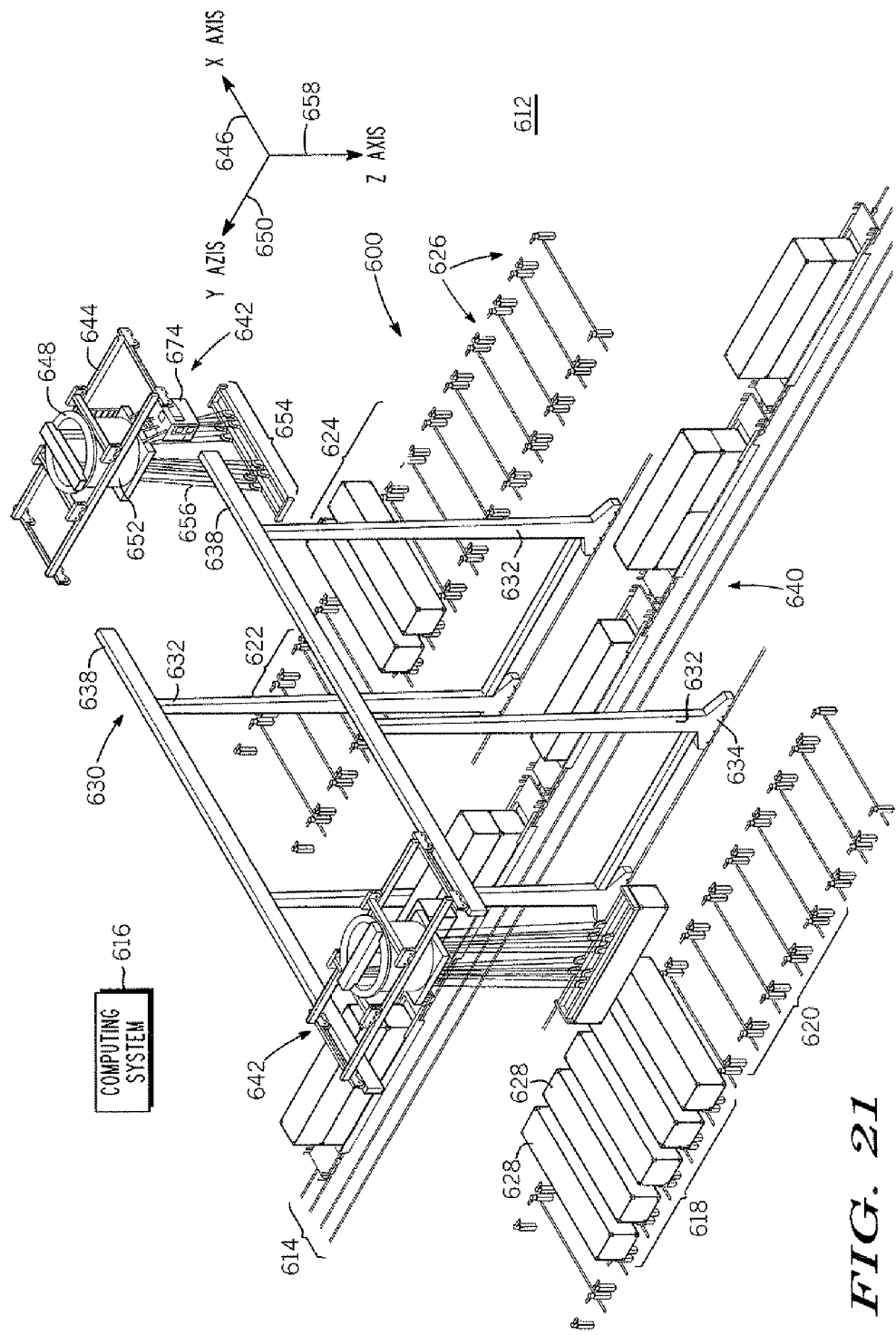
FIG. 21 is a perspective view of the Hub and Distribution System in FIG. 20, showing a crane with a trolley mechanism for efficient loading and transporting containers between railcars and pathways, in accordance with the instant invention.
Figure 22:
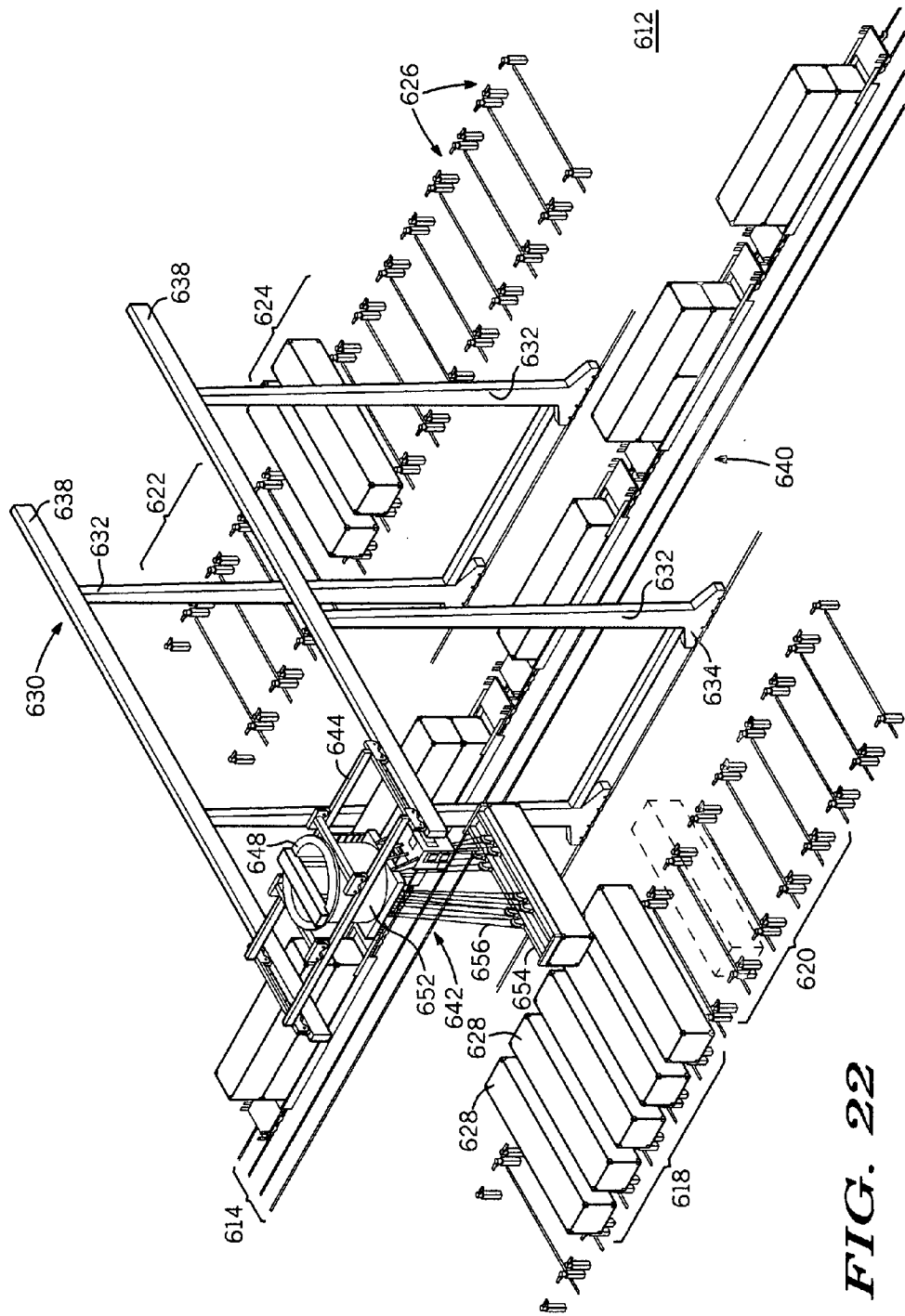
FIG. 22 is a perspective view of the Hub and Distribution System in FIG. 20, showing a crane with a trolley mechanism above and in the process of populating a pathway, in accordance with the instant invention.
Figure 23:
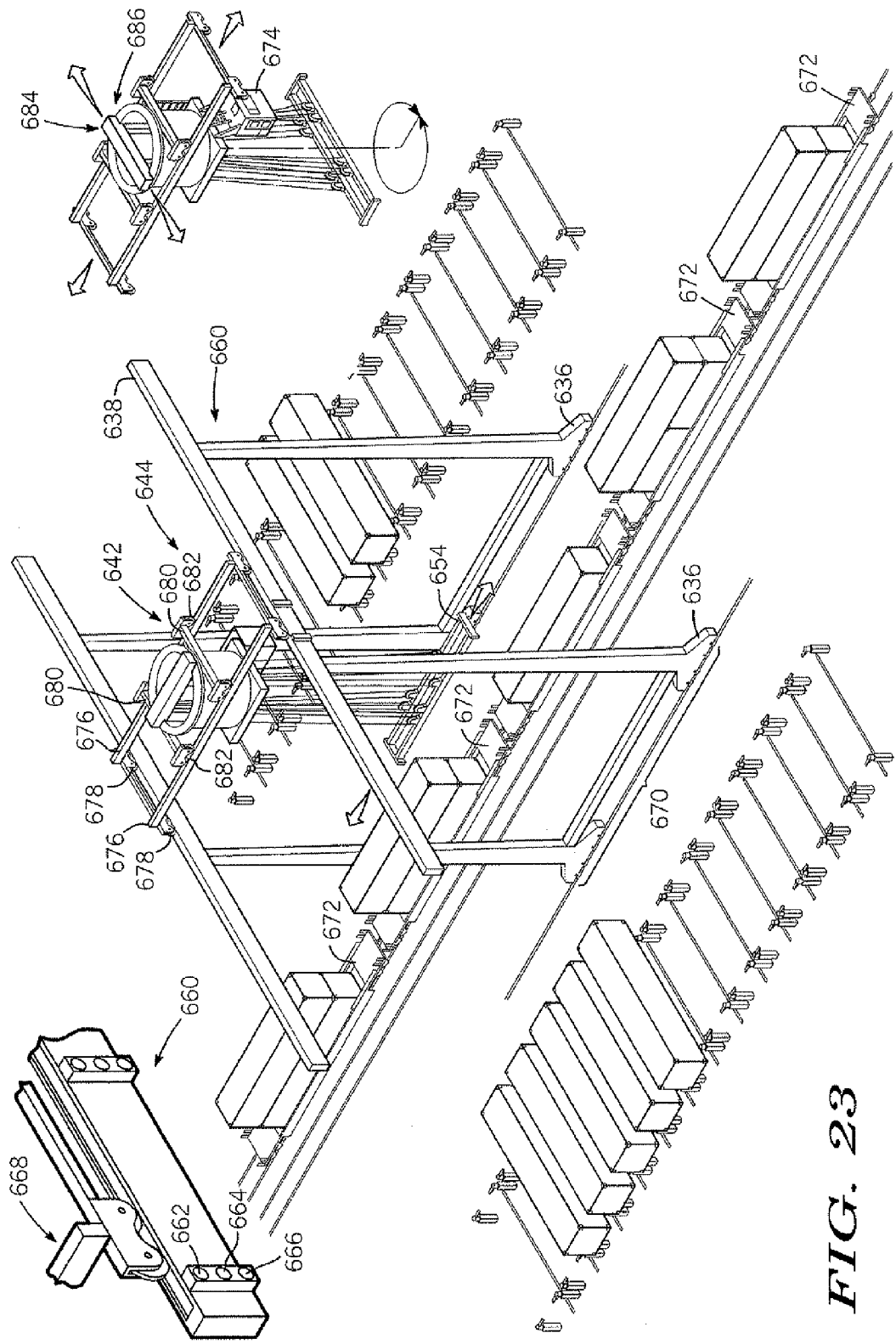
FIG. 23 is a perspective view of the Hub and Distribution System in FIG. 20, showing a crane with a wheelbase sufficient to substantially straddle two railcars, with a cut away of operation indicators and the trolley mechanism, in accordance with the instant invention.

Turning to the picking and placing steps 606 and 608, they can include the steps of: lifting the first container from the railroad car in a substantially vertical direction; transporting the first container in a substantially perpendicular direction with respect to the rail tracks; rotating the first container at an angle of about at least ten or more degrees, preferably about ninety degrees as shown in FIGS. 21-23 for improved clustering, portability and hub logistics, with respect to the train rails and aligning the first container with the at least one pathway; and lowering the first container in a substantially vertical direction onto the at least one pathway, in a substantially unitary motion by use of a crane. This is a timely, efficient and repeatable process.

In more detail and worded differently, the hub system 600 in FIG. 20, can further include the steps of: populating a block of pathways of a corridor with containers via a crane, defining a first container hand off from the crane to a pathway (which is similar to the steps 606 and 608 detailed herein); and transferring the container from the block of pathways to a chassis, defining a second hand off, for hauling to a remote location, like step 610.

In one embodiment, the hub system 600 can further include sensing at least one of height, length and proper alignment of the container in the pathway, prior to the placing step 608, for improved efficiency, reliability and repeatability, as detailed herein.

Likewise, in one embodiment, the hub system 600 can also include: assigning a second corridor, such as corridor 346 in FIG. 9, for populating with containers 6-10, having a substantially common second desired remote destination, such as a local south destination, defining a second block of outbound containers. Advantageously, corridors 348 and 350, can have local west and east desired local destinations. The containers in such corridors are preferably blocked as well, for simplified and efficient directions, logistics and instructions to drivers, crane operators and hub/terminal personnel and general terminal logistics. As should be understood, the inbound and outbound corridors can be changed or reversed as needed, for improved efficiencies, if desired.

In more detail in FIG. 9, populating the second block of pathways, such as corridor 346, with a second block of containers, such as 6-10 via a crane 346, can be defined as a crane-pathway hand off, from the crane to the second block of pathways; and transferring at least one of the blocked containers from the second block of pathways to a chassis, can be defined as a pathway-hauler hand off.

In FIG. 9, an inbound and outbound concourse are provided, which include a multiplicity of corridors for use with inbound and outbound traffic, as previously detailed, for improved processing of loads.

In FIG. 21, a hub system 600 is shown. It can include: a terminal 612 including a substantially contiguous plot of land and train rails 614; a computing system 616, located locally or remotely, for making container travel reservations, storing information and tracking container travel during transit; a first corridor 618, a second corridor 620, a third corridor 622 and a fourth corridor 624, adapted to facilitate blocking of containers including a plurality of pathways (buffers and/or pathfinders as detailed herein) 626 located at a track side location adjacent to the train rails 614, the pathways including support structure adapted to temporarily receive (or provide a buffer) containers 628 in the corridor; and a crane 630 for carrying containers between a rail car and at least one pathway of a corridor. This arrangement provides a simplified system for handling inbound and outbound container traffic.

In a preferred embodiment, the crane 630 includes: structure for lifting a container from or to a railroad car in a substantially vertical direction; structure for transporting the container in a substantially perpendicular direction with respect to the train rails; structure for rotating and aligning a container with respect to the at least one pathway; and structure for lowering the container in a substantially vertical direction onto the at least one pathway, in a substantially unitary motion, as detailed herein. This provides a reliable system of handling container incoming on rail and out-going from the pathway(s).

Advantageously, the corridor(s) 618, 620, 622 and 624, shown in FIG. 21, preferably include a block of pathways being substantially clustered, aligned and in parallel, defining a densely configured corridor, for improved space utilization. And further, the system includes at least one motorized vehicle capable of transporting the container to or from at least one of the pathways of the corridor.

In an embodiment shown in FIGS. 21-24, a simplified gantry crane 630 is shown. In its simplest form, it includes: a crane 630 including upright corner columns 632 supported by pivotally attached wheel assemblies 634; a drive mechanism 636 for gantrying or moving the crane along a ground surface; a plurality of horizontal beams 638 connected to the upright corner columns 632 forming an open-centered frame 640 for straddling and handling containers; a trolley mechanism 642 including a first X component 644 for allowing lateral movement along an X-axis 646 and parallel to the horizontal beams 638, a second Y component 648 for allowing movement perpendicular to the horizontal beams along a Y-axis 650; a rotatable turntable 652, and a latch interconnect system 654 coupled to the rotatable turntable 652 by connection structure 656, the latch interconnect system 654 adapted to lifting a load or container along a Z-axis 658 and transporting a container to a desired location.

As shown in FIG. 23, in a preferred embodiment, the crane 630 includes operational indicators 660, each placed and aligned over desired tracks, and includes first, second and third overhead indicators 662, 664 and 666, connected in proximity to or placed on the plurality of horizontal beams 638 for signaling various conditions or warnings, such as a blue flag condition, stop/red and go/green. In FIG. 23, the indicators 660 are positioned above and in alignment with each set of tracks, for improved indications. As should be understood, the actual number of banks of indicators 660 (two shown in FIG. 23), can be varied to meet the application, or number of tracks. Advantageously, the indicators provide a highly visible indication of the track conditions for all personnel to see. For example, a blue flag condition or blue light indicates rail traffic is occurring or imminent and containers are prohibited from being transported over a blue flagged track. A red light indicates stop, like in automobile traffic and proceed with caution, and a green light is an indication that train traffic may proceed.

In one application shown in FIG. 23, the crane 630 includes a partial lockout operation 668, whereby the trolley mechanism 642 is prohibited from trolleying along a portion of the plurality of horizontal beams along the X-axis 646, when a blue flag condition at 662, is set substantially above a blue flagged track. In this example, the trolley 642 is prohibited from moving over a blue flagged track, for improved visibility, safety and coordination of hub, driver, crane, rail and terminal personnel.

In a preferred embodiment, as shown in FIG. 23, the wheelbase 670 (along the y-axis 650) is substantially sufficiently wide enough to span the length of about two rail cars. This arrangement allows a crane operator to unload two train cars, or six containers, without the necessity of gantrying (driving along the train rails 614 or along the Y-axis 650), thus saving fuel costs and providing efficiency in the loading and unloading process, between corridors 618 and train cars 672. As should be understood by those skilled in the art, the wheelbase can vary widely, such as from 20 feet or more. In a preferred application, it is about eighty five feet, to accommodate two rail cars for minimal gantrying. Likewise, the overall height of the crane can vary, and preferably is sufficiently high to freely transport containers over multi-stacked containers on railcars.

As shown in FIGS. 21-23, an operator cab 674 is connected, designed and configured to the trolley mechanism 642, for improved visibility from above the container and train rails during operation.

In more detail, as shown in FIG. 23, the first X component 644 includes structure including horizontal members 676 along the Y-axis with wheels 678 configured to ride along the horizontal beams 638 along the X-axis.

Likewise, the second Y component 648 includes structure including horizontal members 680 along the Y-axis 650 with wheels 682 configured to ride along the horizontal members 676 along the Y-axis 650.

The latch interconnect system 654 is configured to include structure for interconnecting with containers, such as with twist lock mechanisms interacting with container corner castings and the like, and connection structure 654, in the form of cables in FIGS. 21 and 23, for simple transferring and loading and unloading logistics.

As should be understood, the figures herein are simplified and do not show detailed driving means and controls for each of the first X component 644, second Y component 648, rotatable turntable 652 and latch interconnect structure 654, etc. for simplicity of discussion.

The rotatable turntable 652 includes structure including driving means 684 and bearings 686 configured to allow rotation thereof, for rotating and aligning containers and/or loads, as desired.

As should be understood by those skilled in the art, various modifications and alterations can be made without departing from the spirit and scope of this invention.

1. Example One of an Active Buffer

As used herein, a buffer or pathfinder (used interchangeably), means a docking and/or lifting system to expedite the loading and unloading of containers at hubs, terminals, intermodal facilities and the like. It can be referred to as a pathfinder, because it allows a terminal facility to offer multiple options in finding the path of the least operational resistance, thereby minimizing terminal operation costs and enhancing efficiency.

More particularly, without requiring the use of an additional lifting device, the buffer is designed to receive, store, and discharge containers at a terminal when a tractor chassis or crane delivers containers. A terminal can be equipped with a few to over a thousand buffers. The optimal number will depend on the projected amount of inbound or outbound traffic.

Buffers are preferably permanently set trackside in concrete foundations, and a fully equipped terminal can include one thousand buffers per track depending on the available length of the track rails. Each buffer functions like an overhead rail or rubber tire gantry crane, loading or unloading containers on to or off of the truck line carrier's chassis. Independently-powered buffers, can have a lifting capacity of 100,000 pounds, load or unload from truck line chassis to the buffer or from the buffer to the truck line chassis without any assistance from the rail overhead crane. This frees up the crane operator to make other lifts.

The buffer or pathfinder system is independent of, and does not interfere with, ramp operations. In other words, there is no or minimal need to alter operations to accommodate inbound or outbound freight. Advantageously, there is little or no need for "real time" synchronization between the gate, crane and/or truck operators.

Any container entering or leaving the terminal will require a single overhead crane lift, along with the assistance of the pathfinder, to load or unload a container to or from the truck line chassis or rail car. The sequence will be either from railcar-pathfinder-chassis, or chassis-pathfinder-railcar.

Turning now to Direct Gate Dispatch (DGD) Terminal Operations, the DGD controls the in and outbound traffic that arrives at the gate for picking up containers that have already been delivered at the terminal or delivering containers for outbound trains. With the use of key cards, for example, similar to the system used by the hotel industry for entering rooms, the DGD design makes it possible for gate personnel to direct and operate the in or outbound containers to a specific temporary storage position (Pathfinder), which has its own independent power to lift or lower the container (either load or remove a container or store a container). Substantially, all of the operational sequences are done at trackside by the truck line driver or other operator. This operation offers no wait self-service. This type of operation gives the driver complete independence for receiving or delivering containers, independence that permit drivers to be in and out of the terminal in as little as twenty minutes or less, without interrupting or interfering with the overhead crane servicing the in or outbound trains.

While the crane is working over the tracks unloading inbound containers from the rail car to the buffers or pathfinders, the container number and buffer identification are being registered and transmitted to the gate. When the truck line carrier arrives at the gate to pickup an inbound container, and after the driver is identified and confirmed, the driver is given a keycard with the buffer number and location of the buffer in the terminal. The driver may be given one or two keycards. In the case of two keycards, one keycard would be to deliver to an empty buffer for outbound departure, and the other for a loaded buffer to unload to the truck line carrier chassis for a local delivery, for example.

The system preferably includes a timing device to record the driver's time in and out of a buffer. The DGD system can be highly automated and should shorten the average time of driver gate queues, and improve driver and truck productivity. For example, by sending automatic notifications to the shipper about an unpicked up container, and assessing a penalty charge after 24 hours, the system minimizes the need for container storage at the terminal.

Relative to inbound containers (Buffer to Chassis), the driver is instructed by the terminal gate personnel to go to a selected buffer gate, and is given a color coded keycard and identification number to operate the buffer for loading the container. After the driver arrives at the selected buffer bay, and the chassis is in the proper position to unload the container from the buffer to the chassis, the driver will insert the keycard into a controller located at window height of the driver side door so that the driver can operate the buffer controls from the cab. A blinking green light signals the driver that he or she is in the correct buffer bay. The truck driver then pushes the unload button to slowly lower the container from the pathfinder to the chassis. Next, the driver pulls the chassis forward out of the buffer bay and heads toward the exit gate. At the gate, the driver deposits the keycard in a lock box, the exit gate opens, and then automatically closes when the driver and chassis are clear.

In the event of a missing or unaccounted for container, the administrator has an activity record that provides driver identification, including fingerprints and the like, for further investigation.

Turning now to outbound containers (chassis to buffer), once the driver properly positions the chassis and container in the buffer bay, in one embodiment, he or she inserts the key card. A blinking green light signals the driver that he or she is at the correct buffer. He or she then pushes the load button, which engages the hoist mechanism, to lift the container off the chassis and on to the buffer. After the container is loaded on the buffer, a green light stops blinking and remains green, which signals the driver to remove the key card and pull the chassis forward. The driver may then exit the terminal or pick up a full container from another buffer to be delivered remotely.

In one embodiment, each section of the pathfinder system can be painted different colors or appropriately color coded, addressed, etc. to identify each corridor (east, west, north, south) so that the truck line carrier delivers the container to the correct buffer for the correct corridor. The system is substantially fail safe, as the keycard card will only operate the selected buffer that it is assigned to for loading the container from the chassis to the buffer.

The system described herein, provides many benefits, such as: Lower fuel requirements to operate equipment and less wait time. Reduced congestion in a terminal. Truck line carrier time in a terminal should be less than 30 minutes. Lower dependency on overhead crane. Less operating personnel. Late inbound train arrivals can be unloaded faster from a buffer system than a conventional chassis container at trackside system. All outbound containers are placed at a track side pathfinder, essential for expediting arrival of outbound trains particularly when inbound trains are arriving late. No or minimal need for stacking of containers for inbound or outbound operation. No or minimal need for remote storage areas. No or minimal need for chassis requirements or chassis stackers. Requires minimal real estate. For example, in one calculation, on 142 acres (including 14% devoted to Pathfinder storage for overlay of 30 hrs before pickup), an inline DGD/Pathfinder system would entail: 3 independent inline ramp operations each with 2 tracks and 1,040 Pathfinder stands for each ramp (total of 3,120 Pathfinder stands), and thirty-two, 42' roadways. In comparison, a conventional terminal design would require 300 acres for the same capacity of 1,140,000 lifts per year. Lower costs for inline construction terminal design. Lower costs and minimal crane picks to operate the instant operation. All containers for storage can be immediately selected without multiple handling.

2. Example Two

Turning now to buffer operations at a distribution center, many efficiencies of the system can be realized using buffer systems. Thus, the many advantages detailed herein are also adaptable by the business community, in applications like distribution warehousing and the like. If receiving docks are equipped with two or three pathfinder stations, the costs savings can be apparent to truck line carriers, ship lines and the company using pathfinders to receive container freight. Detailed below are some benefits.

A company's normal business operation will not be interrupted for full loads of freight in a container. (Presently, typically anytime a truck line carrier arrives to deliver freight it must be unloaded in one hour or there will be an extra charge to the receiving party for the driver's time and equipment utilization. This surcharge will no longer be a concern for company's with a pathfinder.)

Once the driver is in position to unload the container from the chassis to the pathfinder it can take as little as ten minutes or less.

To minimize empty loads and bobtails, if there is an adjacent pathfinder station with an empty container ready for pickup, the driver will be able to unload the empty container from the pathfinder to the chassis, return the empty container to the rail terminal, and lower it into a pathfinder for shipment for an outbound train. The truck line carrier is now available to pickup another full container to deliver to another business.

The self-service nature of the pathfinder allows for truck line carriers to deliver more freight at any time of day or night. Freight in the container can be unloaded at the convenience of the warehouse receiving manager. Freight in a container can also be used as a temporary storage area on a lease per day rate. Receiving docks without Pathfinder stations will be readily available to receive normal deliveries.

The option of delaying unloading delivered containers gives warehouse managers can increase the productivity of their receiving and shipping departments.

When a container is empty, it will be available for reloading of the container for shipment of the company's products.

Empty containers can be picked up and delivered to other companies for shipment in the area.

Shipping lines empty containers can be returned faster.

Companies who have large deliveries of components, or delivery surges at certain times of the year, can use containers as extra storage space upon delivery. By renting containers on a per day basis for these peak inventory periods, the ship lines can generate income from their container assets (for example, at $5 per day, and 10,000 rented, the ship lines would generate $1,500,000 per month for containers equipped with a GPS tracking system).

In connection with communications, as should be understood by those skilled in the art, communication equipments exists to significantly boost the productivity of the inland intermodal terminal and distribution centers that the terminal services. With terminals, dispatchers, drivers and container sharing information on a wireless network, it is possible to boost the throughput volume at the terminal and distribution centers, achieve better equipment utilization, and improve the labor productivity of drayage drivers. The DGD communication system will reduce congestion on the roadways, terminals and distribution centers while improving air quality, security, and safety. Also, improved coordination of drayage, for bi-directional moves for traffic to and from inland intermodal terminals and distribution centers, can be provided by drayage dispatch, which can advise on traffic congestion, and pathfinder/container information.

Interchange capacity management can be improved to responsively manage terminal truck traffic and operations. And, with good communications, real-time traffic management can be optimized, for improved routing and dispatching and the avoidance of congestion and bottlenecks in terminals, distribution centers and the roads.

3. Summary of Advantages of Certain Highlighted Features

The DGD does not interfere with the overhead crane operation that is loading or unloading containers from the railcar to the buffers.

All in or outbound traffic can by orchestrated, directed and dispatched, by the gate personnel substantially error free with keycard, wireless and computing technology.

Keycards and the self-service nature of the system improve driver and crane operator productivity, and truck, buffer and crane utilization and efficiency.

A truck line carrier can easily load or unload a container to or from the buffer, while sitting in his or her cab by pressing a control button to operate the buffer. As should be understood, other means of actuation are contemplated and within the scope of this invention.

When a container is delivered for outbound, for best efficiencies, it is designated to deliver the container at the appropriate corridor at track side, for pre-blocking.

Most if not all in or outbound containers arriving at the terminal can be temporarily stored in a buffer, at track side.

The self service operation can improve load pick up dwell times and load drop off dwell times over conventional terminals, which often require waiting or dead time.

Keycards can be are deposited in a lock box to open the exit gate. The system includes timing devices to assist in investigating terminal thefts. The keycards can be retained for future reference or investigations.

Since the overhead gantry crane does not have to await for chassis delivery trackside, truck and crane operators can work independently, thus substantially reducing gating issues or unnecessary delays.

Any container coming into the terminal whether it arrives by train or truck is only required to be handled once by the terminals overhead cranes.

Terminal and distribution centers can realize enormous driver and chassis productivity gains, and eliminate bobtails and empty trips.

Equipping containers and truck operators with GPS, can improve container utilization and driver efficiency.

What is claimed is:

1. A transfer method for blocking containers having a common destination, said method comprising the steps of:

delivering a container via a rail car on train rails to a terminal;

assigning, to a crane operator, a corridor as to where to deliver the container, the corridor including a plurality of buffers in proximity to a track side location, each buffer including a plurality of vertical supports defining a containment cavity configured to receive the container from a crane and transfer the container from the buffer to a chassis, the plurality of buffers being substantially adjacent, aligned and in parallel to one mother and being configured such that a longitudinal axis of each one of the plurality of buffers is at an angle of about 10 degrees or more with respect to the train rails, the corridor configured to receive a plurality of containers having a common destination;

picking with the crane the container from the rail car, rotating the container at an angle of at least 10 degrees with respect to the train rails, and placing the container in the containment cavity of one of the plurality of buffers; and transferring the container in the containment cavity of the one of the plurality of buffers to a chassis for facilitating transporting of the container from the corridor.

2. The method of claim 1, further comprising: populating the corridor with a block of containers having a common destination.

3. The method of claim 1, further comprising populating a second block of buffers defining a second corridor.

4. The method of claim 1, further comprising: providing a multiplicity of corridors comprised of a plurality of buffers for staging inbound and outbound containers.

5. The method of claim 1 wherein the picking and placing step includes:
   lifting the container from the rail car in a substantially vertical direction;
   transporting the container in a substantially perpendicular direction with respect to the train rails;
   rotating the container at an angle of at least ten degrees with respect to the train rails and aligning the container with the containment cavity of the buffer; and
   lowering the container in a substantially vertical direction into the buffer, in a substantially unitary motion by use of the crane.

6. The method of claim 1, further comprising:
   populating a block of pathways of a corridor with containers via the crane; and
   transferring containers from buffers to chassis.

7. The method of claim 1, further comprising: sensing at least one of height, length and proper alignment of the container in the buffer, prior to the placing step.

8. The method of claim 1, further comprising: assigning a second corridor having a plurality of buffers, for populating with containers having a substantially common second destination.

9. The method of claim 8, further comprising: populating the plurality of buffers in the second corridor with containers via a crane; and
   transferring at least one of the containers from the second corridor to a chassis.

10. The method of claim 1, further comprising: providing a concourse comprising a multiplicity of corridors for use with inbound and outbound traffic.

11. A transfer method for blocking containers having a common destination, said method comprising the steps of:
    delivering a plurality of incoming containers on railcars on train rails to a terminal;
    assigning a first corridor and a second corridor as to where to deliver the plurality of containers, the first and the second corridors including a plurality of buffers, each buffer including a plurality of vertical supports defining a containment cavity configured to receive an incoming container from a crane to a buffer and transfer the incoming container from the buffer to a chassis, the plurality of buffers being substantially adjacent, aligned and in parallel to on another and being configured such that a longitudinal axis of each one of the plurality of buffers is at an angle of about 90 degrees to the train rails, the first and second corridors configured to receive a plurality of containers having common destinations, respectively;
    picking with the crane one of the containers from the rail car, rotating the container at an angle of about 90 degrees with respect to the train rails, and placing the container in the containment cavity of one of the plurality of buffers; and
    transferring the incoming group of containers from the containment cavities to a chassis for transporting to a destination.

12. The method of claim 11, further comprising providing a multiplicity of corridors comprised of a plurality of buffers for staging inbound and outbound containers.

13. The method of claim 11, further comprising sensing at least one of height, length and proper alignment of a container prior to being placed in a buffer.

* * * * *